United States Patent
Khajehoddin et al.

(10) Patent No.: US 10,971,937 B2
(45) Date of Patent: Apr. 6, 2021

(54) GRID-SUPPORTING INVERTERS WITH SIGNIFICANTLY REDUCED STORAGE REQUIREMENTS

(71) Applicant: The Governors of the University of Alberta, Edmonton (CA)

(72) Inventors: Ali Khajehoddin, Edmonton (CA); Masoud Karimi Ghartemani, Edmonton (CA); Mohammad Ebrahimi, Edmonton (CA)

(73) Assignee: THE GOVERNORS OF THE UNIVERSITY OF ALBERTA, Edmonton (CA)

( * ) Notice: Subject to any disclaimer, the term of this patent is extended or adjusted under 35 U.S.C. 154(b) by 232 days.

(21) Appl. No.: 16/142,124

(22) Filed: Sep. 26, 2018

(65) Prior Publication Data

US 2019/0109461 A1    Apr. 11, 2019

Related U.S. Application Data

(60) Provisional application No. 62/563,238, filed on Sep. 26, 2017.

(51) Int. Cl.
*H02J 3/42*    (2006.01)
*H02J 3/38*    (2006.01)
(Continued)

(52) U.S. Cl.
CPC .................... *H02J 3/42* (2013.01);
*H02J 3/24* (2013.01); *H02J 3/383* (2013.01);
*H02J 3/386* (2013.01);
(Continued)

(58) Field of Classification Search
CPC ........ H02J 3/40; H02J 3/42; H02J 3/48; H02J 3/24; H02J 3/46; H02J 3/381;
(Continued)

(56) References Cited

FOREIGN PATENT DOCUMENTS

CA    2774401 A1 *  3/2011  .............. H02M 1/42

OTHER PUBLICATIONS

Kjaer, S.B. et al., "A Review of Single-Phase Grid-Connected Inverters for Photovoltaic Modules", IEEE Transactions on Industry Applications, Sep./Oct., 2005, pp. 1292-1306, vol. 41, No. 5, © 2005 IEEE; DOI: 10.1109/TIA.2005.853371.
(Continued)

*Primary Examiner* — Arnold M Kinkead
(74) *Attorney, Agent, or Firm* — Blue Filament Law PLLC

(57) ABSTRACT

A method for controlling an inverter, and in particular a double stage inverter, for implementing a model of a synchronous generator is provided including implementing a rotor inertia using an intermediate dc-link capacitor without duplicating the emulated inertia in the controller, simulating the rotor speed based on a measured voltage of the dc-link capacitor, while allowing the voltage to change in a defined range, and mapping the changing voltage of the dc-link capacitor into the inverter as an internal frequency. A system for connecting a power generator to a power grid is also provided including a control device for an inverter, the control device implementing a model of a synchronous generator. The control device including a computer processor in electrical communication with a storage device with instructions stored thereon, that when executed on the computer processor, perform the method for controlling an inverter for implementing a model of a synchronous generator.

16 Claims, 27 Drawing Sheets

(51) Int. Cl.
*H02J 3/48* (2006.01)
*H02J 3/24* (2006.01)
*H02J 3/40* (2006.01)
*H02M 1/42* (2007.01)

(52) U.S. Cl.
CPC .................................. *H02J 3/40* (2013.01);
*H02J 3/48* (2013.01); *H02M 1/42* (2013.01);
*H02J 2203/20* (2020.01); *H02J 2300/24*
(2020.01)

(58) Field of Classification Search
CPC ........ H02J 2203/20; H02J 3/383; H02J 3/386;
H02J 2300/24; H02J 2200/28; H02M
1/42
USPC ..... 703/18, 13, 14, 4, 8, 7, 2, 3; 307/18, 19,
307/24, 28, 46, 60, 85, 87, 25
See application file for complete search history.

(56) References Cited

OTHER PUBLICATIONS

Blaabjerg, F. et al., "Overview of Control and Grid Synchronization for Distributed Power Generation Systems", IEEE Transactions on Industrial Electronics, Oct. 2006, pp. 1398-1409, vol. 53, No. 5, © 2006 IEEE; DOI: 10.1109/TIE.2006.881997.

Pogaku, N. et al., "Modeling, Analysis and Testing of Autonomous Operation of an Inverter-Based Microgrid", IEEE Transactions on Power Electronics, Mar. 2007, pp. 613-625, vol. 22, No. 2, © 2007 IEEE; DOI: 10.1109/TPEL.2006.890003.

Beck, H.P. et al., "Virtual Synchronous Machine", Electrical Power Quality and Utilisation, 9th International Conference, Barcelona, Spain, Oct. 9-11, 2007, 6 pages.

Gao, F. et al., "A Control Strategy for a Distributed Generation Unit in Grid-Connected and Autonomous Modes of Operation", IEEE Transactions on Power Delivery, Apr. 2008, pp. 850-859, vol. 23, No. 2, © 2008 IEEE; DOI: 10.1109/TPWRD.2007.915950.

Sao, C.K. et al., "Control and Power Management of Converter Fed Microgrids", IEEE Transactions on Power Systems, Aug. 2008, pp. 1088-1098, vol. 23, No. 3, © 2008 IEEE; DOI: 10.1109/TPWRS.2008.922232.

Zhong, Q.C. et al., "Synchronverters: Inverters That Mimic Synchronous Generators", IEEE Transactions on Industrial Electronics, Apr. 2011, pp. 1259-1267, vol. 58, No. 4, © 2010 IEEE; DOI: 101109/TIE.2010.2048839.

Chen, Y. et al., "Comparison of methods for implementing virtual synchronous machine on inverters", European Association for the Development of Renewable Energies, Environment and Power Quality (EA4EPQ), International Conference on Renewable Energies and Power Quality (ICREPQ'12), Santiago de Compostela, Spain, Mar. 28-30, 2012, pp. 734-739, RE&PQJ, Apr. 2012, vol. 1, No. 10; DOI: 10.24084/repqj10.453.

Alatrash, H. et al., "Generator Emulation Controls for Photovoltaic Inverters", IEEE Transactions on Smart Grid, Jun. 2012, pp. 996-1011, vol. 3, No. 2, © 2012 IEEE; DOI: 10.1109/TSG.2012.2188916.

Parker, S.G. et al., "Regions of Active Damping Control for LCL Filters", 2012 IEEE Energy Conversion Congress and Exposition (ECCE), Raleigh, NC, 2012, pp. 53-60, © 2012 IEEE; DOI: 10.1109/ECCE.2012.6342412.

Guerrero, J.M. et al., "Advanced Control Architectures for Intelligent Microgrids—Part I: Decentralized and Hierarchical Control", IEEE Transactions on Industrial Electronics, Apr. 2013, pp. 1254-1262, vol. 60, No. 4, © 2012 IEEE; DOI: 10.1109/TIE.2012.2194969.

Vasquez, J.C. et al., "Modeling, Analysis, and Design of Stationary-Reference-Frame Droop-Controlled Parallel Three-Phase Voltage Source Inverters", IEEE Transactions on Industrial Electronics, Apr. 2013, pp. 1271-1280, vol. 30, No. 4, © 2012 IEEE; DOI: 10.1109/TIE.2012.2194951.

D'Arco, S. et al., "Virtual Synchronous Machines—Classification of Implementations and Analysis of Equivalence to Droop Controllers for Microgrids", 2013 IEEE Grenoble Conference, Grenoble, France, Jun. 2013, pp. 1-7, © 2013 IEEE; DOI: 10.1109/PTC.2013.6652456.

Khajehoddin, S.A. et al., "DC-Bus Design and Control for a Single-Phase Grid-Connected Renewable Converter With a Small Energy Storage Component", IEEE Transactions on Power Electronics, Jul. 2013, pp. 3245-3254, vol. 28, No. 7, © 2012 IEEE; DOI: 10.1109/TPEL.2012.2222449.

D'Arco, S. et al., "Equivalence of Virtual Synchronous Machines and Frequency-Droops for Converter-Based MicroGrids", IEEE Transactions on Smart Grid, Jan. 2014, pp. 394-395, vol. 5, No. 1, © 2013 IEEE; DOI: 10.1109/TSG.2013.2288000.

Zhong, Q.C. et al., "Self-Synchronized Synchronverters: Inverters Without a Dedicated Synchronization Unit", IEEE Transactions on Power Electronics, Feb. 2014, pp. 617-630, vol. 29, No. 2, © 2013 IEEE; DOI: 10.1109/TPEL.2013.2258684.

Ashabani, M. et al., "Novel Comprehensive Control Framework for Incorporating VSCs to Smart Power Grids Using Bidirectional Synchronous-VSC", IEEE Transactions on Power Systems, Mar. 2014, pp. 943-957, vol. 29, No. 2, © 2013 IEEE; DOI: 10.1109/TPWRS.2013.2287291.

Khajehoddin, S.A. et al., "High Quality Output Current Control for Single Phase Grid-Connected Inverters", 2014 IEEE Applied Power Electronics Conference and Exposition—APEC 2014, Fort Worth, TX, USA, Mar. 16-20, 2014, pp. 1807-1814, © 2014 IEEE; DOI: 10.1109/APEC.2014.6803551.

Ashabani, S.M. et al., "New Family of Microgrid Control and Management Strategies in Smart Distribution Grids—Analysis, Comparison and Testing", IEEE Transactions on Power Systems, Sep. 2014, pp. 2257-2269, vol. 29, No. 5, © 2014 IEEE; DOI: 10.1109/TPWRS.2014.2306016.

Karimi-Ghartemani, M., "Universal Integrated Synchronization and Control for Single-Phase DC/AC Converters", IEEE Transactions on Power Electronics, Mar. 2015, pp. 1544-1557, vol. 30, No. 3, © 2014 IEEE; DOI: 10.1109/TPEL.2014.2304459.

Ebrahimi, M. et al., "Fast and Robust Single-Phase DQ Current Controller for Smart Inverter Applications", IEEE Transactions on Power Electronics, May 2016, pp. 3968-3976, vol. 31, No. 5, © 2015 IEEE; DOI: 10.1109/TPEL.2015.2474696.

Suul, J.A. et al., "Virtual Synchronous Machine-Based Control of a Single-Phase Bi-Directional Battery Charger for Providing Vehicle-to-Grid Services", IEEE Transactions on Industry Applications, Jul./Aug. 2016, pp. 3234-3244, vol. 52, No. 4, © 2016 IEEE; DOI: 10.1109/TIA.2016.2550588.

Xiong, L. et al., "Static Synchronous Generator Model: A New Perspective to Investigate Dynamic Characteristics and Stability Issues of Grid-Tied PWM Inverter", IEEE Transactions on Power Electronics, Sep. 2016, pp. 6264-6280, vol. 31, No. 9, © 2015 IEEE; DOI: 10.1109/TPEL.2015.2498933.

Karimi-Ghartemani, M. et al., "Universal Controller for Three-Phase Inverters in a Microgrid", IEEE Journal of Emerging and Selected Topics in Power Electronics, Dec. 2016, pp. 1342-1353, vol. 4, No. 4, © 2016 IEEE; DOI: 10.1109/JESTPE.2016.2614956.

Dong, S. et al., "Adjusting Synchronverter Dynamic Response Speed via Damping Correction Loop", IEEE Transactions on Energy Conversion, Jun. 2017, pp. 608-619, vol. 32, No. 2, © 2016 IEEE; DOI: 10.1109/TEC.2016.2645450.

Chen, D. et al., "Integration of DC Microgrids as Virtual Synchronous Machines Into the AC Grid", IEEE Transactions on Industrial Electronics, Sep. 2017, pp. 7455-7466, vol. 64, No. 9, © 2017 IEEE; DOI: 10.1109/TIE.2017.2674621.

* cited by examiner

FIG. 2A  Details of CC block: In rotating frame

FIG. 2B  In stationary frame

FIG. 2A-B PRIOR ART

GRID-SUPPORTING INVERTERS WITH SIGNIFICANTLY REDUCED STORAGE REQUIREMENTS

CROSS-REFERENCE TO RELATED APPLICATION

This application claims priority of U.S. Provisional Patent Application Ser. No. 62/563,238 filed Sep. 26, 2017, which is incorporated herein by reference.

FIELD OF THE INVENTION

The present invention relates generally to power generation and distribution, and more specifically to grid-supporting inverters for integration of distributed and renewable energy sources to a power grid.

BACKGROUND OF THE INVENTION

Integration of distributed and renewable energy sources (DERs) such as photovoltaic (PV) and wind systems requires intelligent and efficient inverters that offer advanced functionalities including standalone (SA) and grid-connected (GC) operation, seamless transition between these modes, and grid-supporting and grid-stabilizing functions both during steady-state and transient conditions.

The majority of existing renewable inverters are currently designed to operate in parallel with the grid. Existing renewable inverters feed their harvested power to the grid while complying with the grid codes in terms of quality of their generated current. Some of the smarter types of inverters can also feed or absorb reactive power and can also ride through the transient grid faults and grid frequency swings. Current-controlled (CC) inverters can efficiently control current and ride through the grid faults, but current-controlled inverters have issues with operating in standalone mode and/or weak grid conditions due to the fact that their control is directed towards the current (1).

Voltage-controlled (VC) inverters based on the concept of droop characteristics, based on the operation principles of synchronous generators (SG), have also been recently developed for use as inverters (2), (3) to overcome some of the shortcomings of the current-controlled inverters. The voltage-controlled inverters generally offer a direct voltage support and work in both grid-connected and standalone modes with minor adjustments (such as addition of a virtual impedance and a self-synchronizing scheme). However, voltage-controlled inverters need additional logics to ensure the inverter current transients, as well as current magnitude during voltage sag conditions remain within acceptable limits.

The high penetration level of renewable energy sources into the existing power system also demands the energy sources static and dynamic behaviors to be supportive and stabilizing to the grid. It is commonly stated, for example, that the photovoltaic inverters do not have a physical inertia and do not respond to the grid transients in a stabilizing way similar to a synchronous generator. The dynamic performance of a synchronous generator naturally releases (or absorbs) inertia power during grid transients leading to improved stability. During a transient increase in the grid's active power, for instance, the frequency of the grid active power goes up. This leads to the increase in the rotor speed of the synchronous generator because the frequency of the grid power and the rotor speed are coupled. This results in the synchronous generator absorbing some of the excessive power and storing it as kinetic energy into the rotor mass of the synchronous generator. Conversely, when there is a shortage in the grid's active power and the active power frequency falls, the rotor speed decreases and releases some of its kinetic energy into the grid. In addition to this interesting inertial behavior of the synchronous generator, the governor and exciter control systems of the synchronous generator respond to longer-term transients of the grid in a similar stabilizing way because the governor and exciter simply adopt and modify a similar inertia nature into their logic.

Due to these aforementioned properties of the synchronous generator, the concept of virtual synchronous machine (under various names such as VSM, VISMA, Synchronverter, etc.) has been introduced (4)-(10) to reproduce or mimic the same dynamics of the synchronous generator in an inverter. The virtual synchronous machine (VSM) method model the inertial effect that uses a virtual inertia concept and builds the concept inside the controller. The inverter that uses a VSM will then reproduce that inertia response. This approach implies that the inverter has access to a source of power that can actually supply that inertia. That source is either a battery storage system (BSS), a large dc-link element, the kinetic energy of the wind turbine, etc.

In an inverter where a battery storage system or a large de-link element is not present, the existing VSM methods cannot successfully work to their potential. The method of (11) adds a control of the de link voltage for bidirectional dc/ac converters and high-voltage, direct current (HVDC) electric power transmission system applications, while the method (11) still assumes a virtual inertia in the controller. This is a contradictory approach since it is not clear whether the dc voltage controller determines the inertia response or the VSM controller, and these two controllers will compete and oscillate against each other and lead to instability.

Implementing a virtual synchronous machine for an inverter (without a battery storage system or a large capacitor) requires a dc bus voltage controller coupled with an inertia controller that reflects the physical constraints (such as its size and voltage) associated with this dc element. This is clear by considering the system block diagram as shown in prior art FIG. 1, FIG. 1 shows single-line diagram of a three-phase double-stage system (2). The Stage I normally harvests the maximum power called maximum power point tracking (MPPT). Stage II is an inverter to harvest the energy from the intermediate dc bus capacitor, $C_{dc}$, and deliver the energy to supply a local load and/or to be injected into the grid.

As described briefly above, in general there are two different approaches to design control systems for inverters namely current control and voltage control methods. In current control methods, a current control loop based on a feedback of the output current is used where, the reference for the loop is formed based on a phase locked loop (PLL) that operates on the output voltage. In voltage control methods, the reference for the voltage is generated based on either the droop principles or virtual synchronous machine (VSM) approaches. In these methods, additional internal loops may or may not exist.

FIG. 2C illustrates a prior art block diagram of a commonly used inverter current control method (13). Converter of Stage I regulates the input power ($P_{in}$) and forwards the input power to the intermediate bus capacitor. A proportional integral (PI) controller regulates the dc bus voltage and generates the active current reference value ($I_d^*$). Reactive current reference ($I_q^*$) in this configuration is determined by the reactive power control (QC) block which operates based on the grid voltage amplitude ($V_g$) and the reactive power nominal value ($Q_n$). These reference currents are then controlled by the current controller (CC) block. The current controller could be implemented with two well-known methods, as shown in expanded view prior art FIG. 2A (in rotating frame) and in expanded view prior art FIG. 2B (in stationary frame). In rotating or DQ frame, shown in prior art FIG. 2A, grid current i is transformed into the DQ frame and proportional integral controllers are used to generate the inverter reference voltage e*. Feed forward and decoupling terms are also shown in this figure which help for better dynamic performance of the controller. In stationary frame, shown in prior art FIG. 29, on the other hand, the reference signal is generated using $$\tilde{\sin}(\theta) = \left[\sin(\theta) \ \sin\left(\theta - \frac{2\pi}{3}\right) \ \sin\left(\theta + \frac{2\pi}{3}\right)\right] \text{ and}$$

$$\tilde{\cos}(\theta) = -\left[\cos(\theta) \ \cos\left(\theta - \frac{2\pi}{3}\right) \ \cos\left(\theta + \frac{2\pi}{3}\right)\right],$$

which are the in-phase and quadrature-phase signals of the grid voltage from the PLL. The grid current is then regulated using proportional resonant (PR) controllers to generate the output reference voltage e*. In three phase systems, the control signal e* is then divided by half of the dc link nominal voltage (0.5 $V_{dc,n}$) forming the modulation index that is used to generate the gating signals for the inverter switches. Although the block diagrams of prior art FIGS. 2A-C are drawn for a three-phase system application, similar controller structures can be used to control a single-phase double stage inverter (14), (15). The inverter controllers of prior art FIGS. 2A-C are limited to operate the inverter in grid-connected (GC) mode because the inverter controllers need an already established voltage.

FIG. 2D illustrates a prior art block diagram of a commonly used inverter voltage control method. Voltage control approaches can be categorized into two wide groups namely direct droop-based methods and virtual synchronous machine (VSM) methods. In the direct droop method the voltage reference is generated based on the amplitude and frequency which are obtained from $\omega = \omega_n + k_p (P_n - P)$ and $V = V_n + k_q (Q_n - Q)$, where $\omega_n$ and $V_n$ are the nominal grid voltage frequency and amplitude, $P_n$ is the nominal active power, and $k_p$ and $k_q$ are the active and reactive power droop coefficients. Active power (P) and reactive power (Q) are averaged values which are calculated from the output voltage and current signals and low-pass filters. Close correspondence between this method and VSM approach is shown in (16).

The use of synchronous generators (SG) is the well-established in the existing power systems, where the natural and controlled properties of synchronous generators have been extensively studied. The technically attractive properties of the SGs may be summarized as follows. i) SG is primarily voltage source and can establish a voltage. ii) mechanical speed and electrical frequency are directly coupled and are synchronized. This leads to the possibility of interconnecting SGs to form a grid with a stable frequency. iii) Kinetic energy of the rotor acts as a stabilizing inertia during transients and disturbances. iv) Droop-based governor and excitation automatic voltage regulator (AVR)) control systems make the SG respond efficiently to output power while maintaining the frequency and voltage within practically acceptable limits. Due to these properties, the concept of VSM has been developed (in slightly varying formats) in order to furnish an inverter with appropriate control systems such that the inverter can display the virtual synchronous machine (VSM) or synchronous generator (SG) properties during operation. Ideally, a VSM can also improve stability margins of the SG thanks to software and thus flexible implementation of dampers.

A circuit diagram and an equivalent model of the SG is presented in prior art FIGS. 3A and 3B, respectively. According to a rotor speed (or frequency) drooping characteristics, the governor adjusts the flow of input mechanical power into the machine. The SG converts this power to an output electrical power. According to a voltage magnitude droop characteristics, the exciter adjusts the current into the filed winding of the machine, which in turn adjusts the delivered reactive power of the machine. The internally induced voltage in FIG. 3B is shown by e with magnitude E and angle θ, where $$\theta = \frac{n_p}{2}\theta_m$$

and $n_p$ is the number of pole pairs and $\theta_m$ is the mechanical angle of the rotor. The damper windings are located on the rotor to stabilize the SG during transients and disturbances. In a simplified form, governing electromechanical (also called the swing) equation of an SG is expressed as $$J\frac{d\omega_m}{dt} + D'(\omega_m - \omega_g) = \tau_m - \tau_e, \qquad \text{Eq. 1}$$

where J denotes the moment of inertia of the rotor mass, $\tau_m$ and $\tau_e$ the mechanical and electrical torque on the machine shaft, $\omega_g$ the grid angular frequency, and $\omega_m$ the rotor electrical speed (a 2-pole SG is considered for simplicity). The term $D'(\omega_m - \omega_g)$ in this equation is a simplified model of the damper winding. Considering $p_{in}$ and $p_{out}$ as the input and output powers and noting $(\tau_m - \tau_e)\omega_m = p_{in} - p_{out}$, (Eq. 1) can be expressed as $$J\omega_m\frac{d\omega_m}{dt} + D(\omega_m - \omega_g) = p_{in} - p_{out} \qquad \text{Eq. 2}$$

where $P_{dmp} = D(\omega_m - \omega_g)$ models the damper windings in terms of power instead of torque (17), which is the common way of modeling the damper windings without engaging the circuit level equations of those windings. As shown in prior art FIGS. 3A and 3B, $\omega_m$ is the rotor speed and the frequency of the SG's internal voltage e. The rotor speed, $\omega_m$, becomes equal to $\omega_g$ in the steady state in a stable grid. The interaction between the internal voltage and the grid voltage via the SG's total equivalent inductance generates the output current.

There are two different type of dynamics in the swing equation (2). The input power $p_{in}$ is adjusted by the governor control system whose bandwidth is in the range of 0.3-3.0 Hz and the inertia behavior is represented by the term $J \omega_m \dot\omega_m$ whose dominant frequency range covers 3-30 Hz (18). The governor response is proportional to $\omega_n - \omega_m$ and the inertia response is proportional to $-\dot\omega_m$. As shown in prior art FIGS. 4A and 4B, the inertia power and the governor power will behave differently in response to a grid frequency swing at different rates. Since the governor is slow, the response of the governor to low-frequency swings is more dominant than the natural inertia response of the rotor as shown in prior art FIG. 4A. Conversely, when a quick swing happens, the rotor inertia response is more dominant than the governor response as shown in prior art FIG. 4B. It is worthwhile noting that the distinction between these two behaviors must be taken into consideration when a VSM intends to fully mimic a synchronous generator in order to be able to be fully compatible with the existing grid and be smoothly integrated.

FIG. 3C illustrates a typical prior art model of the virtual synchronous machine (VSM) control approach to supplying power to a grid. It is clearly observed that the VSM copies the synchronous generator (SG) principles to a large extent. The reactive power control (QC) block in the VSM is equivalent to the Exciter of an SG that controls the internal voltage amplitude. There are critical factors and aspects related to the damping and inertia properties of existing VSMs which illustratively include the following:

1) The damper winding is not easily emulated. The point denoted by $\omega_x$ needs to be exactly equal to the grid frequency. In (8), the measured grid frequency is used and the interaction between the frequency estimation dynamics and the VSM could be an issue especially in weak grid situations and in fast frequency changing conditions. In (5), the nominal value of the grid frequency is used and thus unlike the actual SG, in this approach the output of the damper winding model generates a steady state power when a frequency offset exists. In (19), a transfer function $f(s)$ is applied to $\dot{\omega}_m$ to provide this damping. In (20) a first order low pass transfer function is used for $f(s)$. The advantage of the methods based on $\dot{\omega}_m$ is that methods do not need a grid frequency measurement. However, such methods totally alter the swing equation and the methods must be carefully designed (if possible at all) so as not to alter the desired response properties of methods. In (9), (10) another approach is used which is equivalent to adding the derivative of power as the damping term. This is similar to what is also presented in (21) and is shown to offer improved damping properties.

2) The "virtual" moment of inertia is given by J. This implies that the system is physically able to supply this level of inertia. In other words, there is an implicit assumption that the system is equipped with adequate storage capacity being in the form of battery storage, capacitor, rotating inertia such as wind or a combination of multiple sources.

3) For the VSM to accurately mimic a SG, for a fast disturbance in the grid frequency in the frequency range of the inertia, the input power $p_{in}$ which is controlled by the governor should be almost constant. Otherwise, the dynamics of the input power will interfere with the inertia and the system dynamics will deviate from that of the SG. The existing VSMs appear to overlook this fact and they do not exactly mimic the inertia dynamics of an actual SG as the existing VSM do not model the dynamics of the governor.

4) The power source can be implemented using a battery where there is no need for an extra dc bus control block diagram and there will be no extra dynamics due to the bus capacitor. In this case, the overall VSM behavior is identical to an SG if the governor and damper dynamics are also accurately modeled. However, when a VSM approach is used for a photovoltaic (PV) or other power sources where a two-stage power converter is needed, the dc bus controller and bus capacitors have to be designed such that they do not add significant dynamics to the already achieved dynamics of the SG. In some approaches, such as (11), (22) a dc bus controller is added into the VSM method whose equivalent control block diagram is shown in prior art FIG. 3D. It is clearly observed from prior art FIG. 3D that bus capacitor dynamics are added to the original VSM. This extra dynamic appears as an outer loop with respect to the internal VSM loop. Thus, this outer loop (that is shown in the dotted box A in prior art FIG. 3D) should be much slower so as not to alter the VSM dynamics, and this demands an excessively large capacitor compared to the emulated inertia. This setup will completely alter the dynamics of the system and deviates from the original VSM responses if the dc-bus capacitor is not "very large".

Thus, there is a need for improved grid-supporting inverters for integration of distributed and renewable energy sources to a power grid. There is a further need for virtual synchronous machine (VSM) models with an improved frequency response to more closely mimic a synchronous generator.

SUMMARY OF THE INVENTION

A method for control of an inverter for implementing a model of a synchronous generator is provided. The method includes implementing a rotor inertia using an intermediate dc-link capacitor without duplicating the emulated inertia in the controller, simulating the rotor speed based on a measured capacitor voltage of the intermediate dc-link capacitor, while allowing the capacitor voltage to change in a defined range, and mapping the changing capacitor voltage of the intermediate dc-link capacitor into the double-stage inverter as an internal frequency. The inverter can be a double-stage inverter. A system for connecting a power generation unit to a power grid is also provided. The system includes a control device for an inverter, the control device implementing a model of a synchronous generator. The control device including a computer processor in electrical communication with a storage device with instructions stored thereon, that when executed on the computer processor, perform the steps of implementing a rotor inertia using an intermediate dc-link capacitor, simulating the rotor speed based on a measured capacitor voltage of the intermediate dc-link capacitor, while allowing the capacitor voltage to change in a defined range, and mapping the changing capacitor voltage of the intermediate dc-link capacitor into an inverter as an internal frequency.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 2A is an expanded view of a prior art current controller (CC) block in a rotating frame of FIG. 2C;

FIG. 2B is an expanded view of a prior art current controller (CC) block in stationary frame of FIG. 2C;

DESCRIPTION OF THE INVENTION

Figure 1:
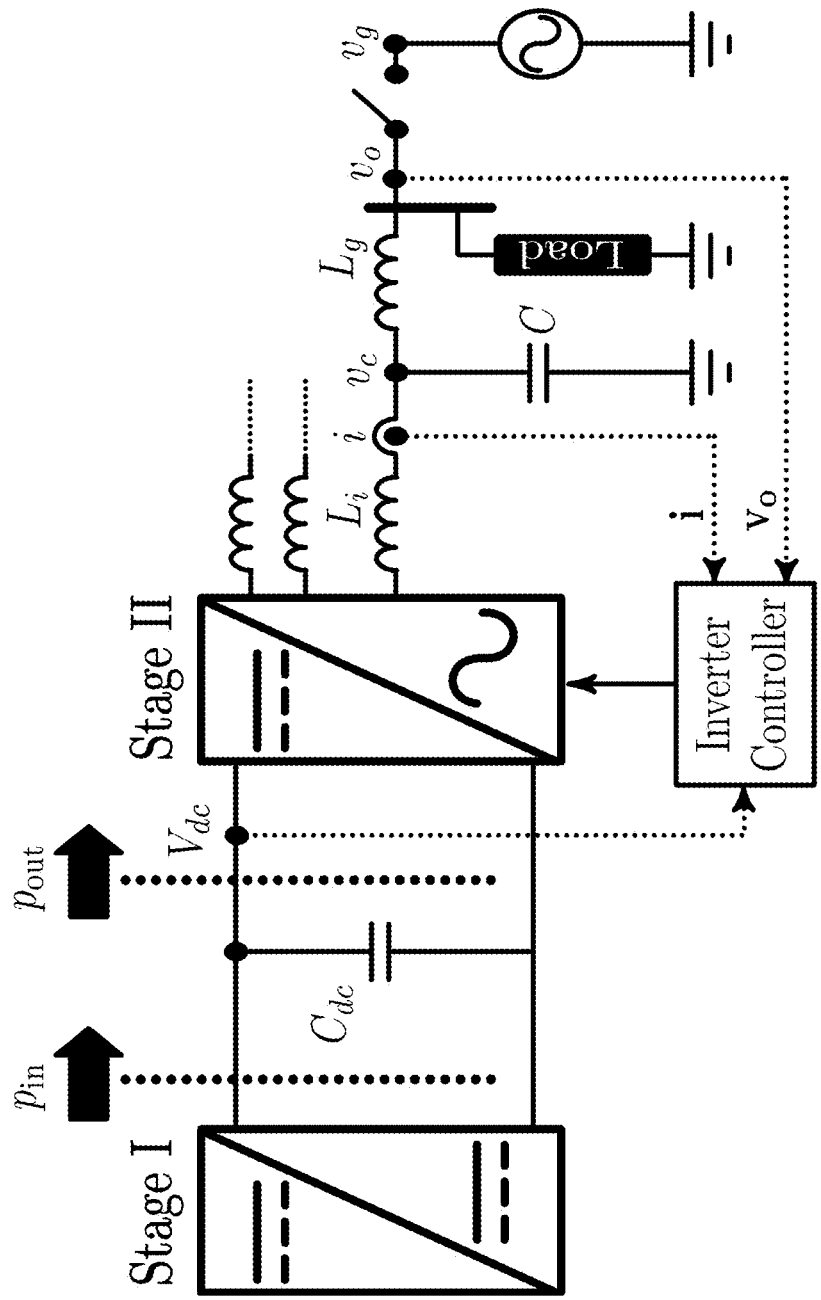
FIG. 1 is a block diagram of a prior art double-stage inverter.
Figure 2C:
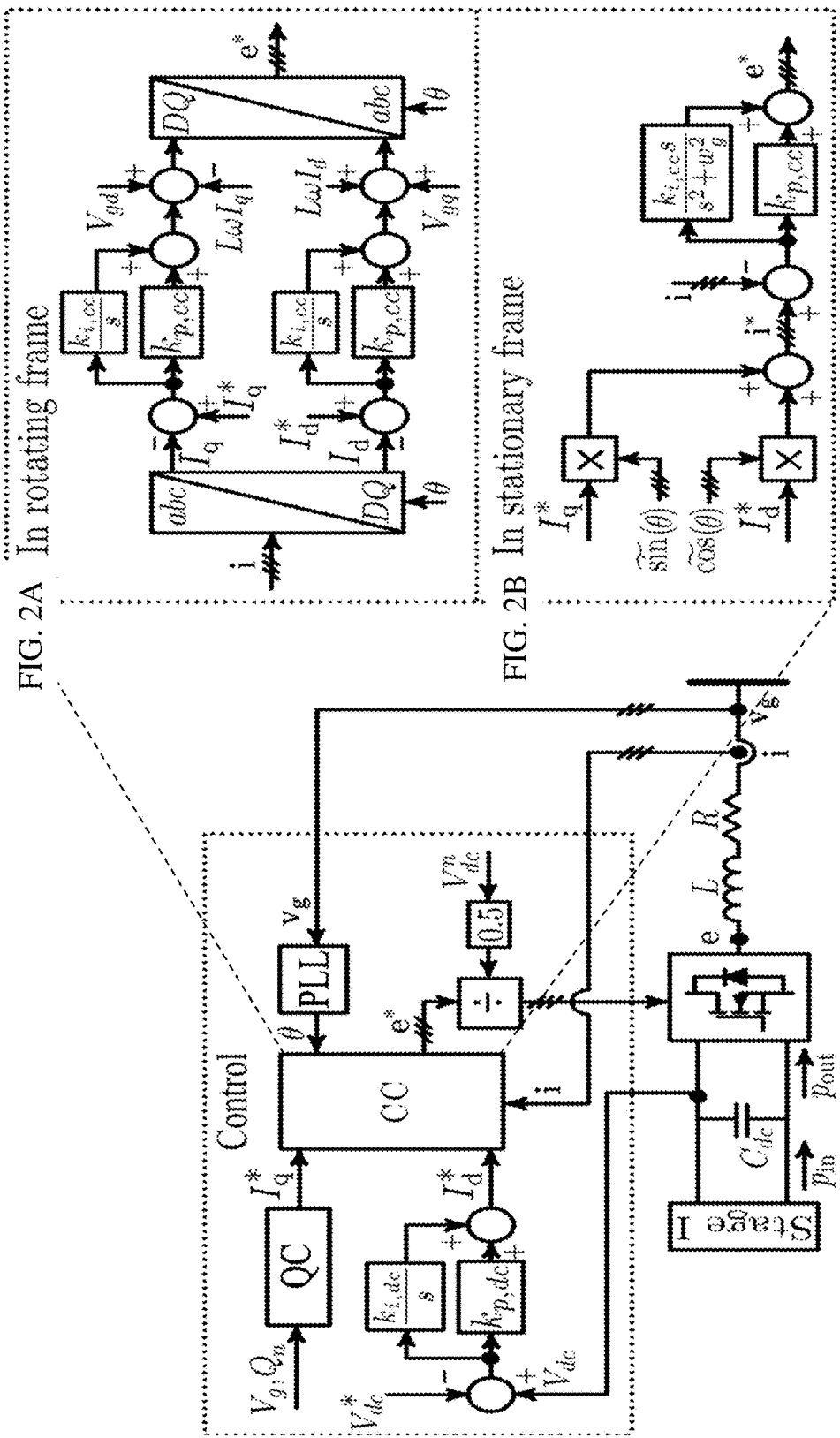
FIG. 2C illustrates a block diagram of a prior art inverter using a current control method.
Figure 2D:
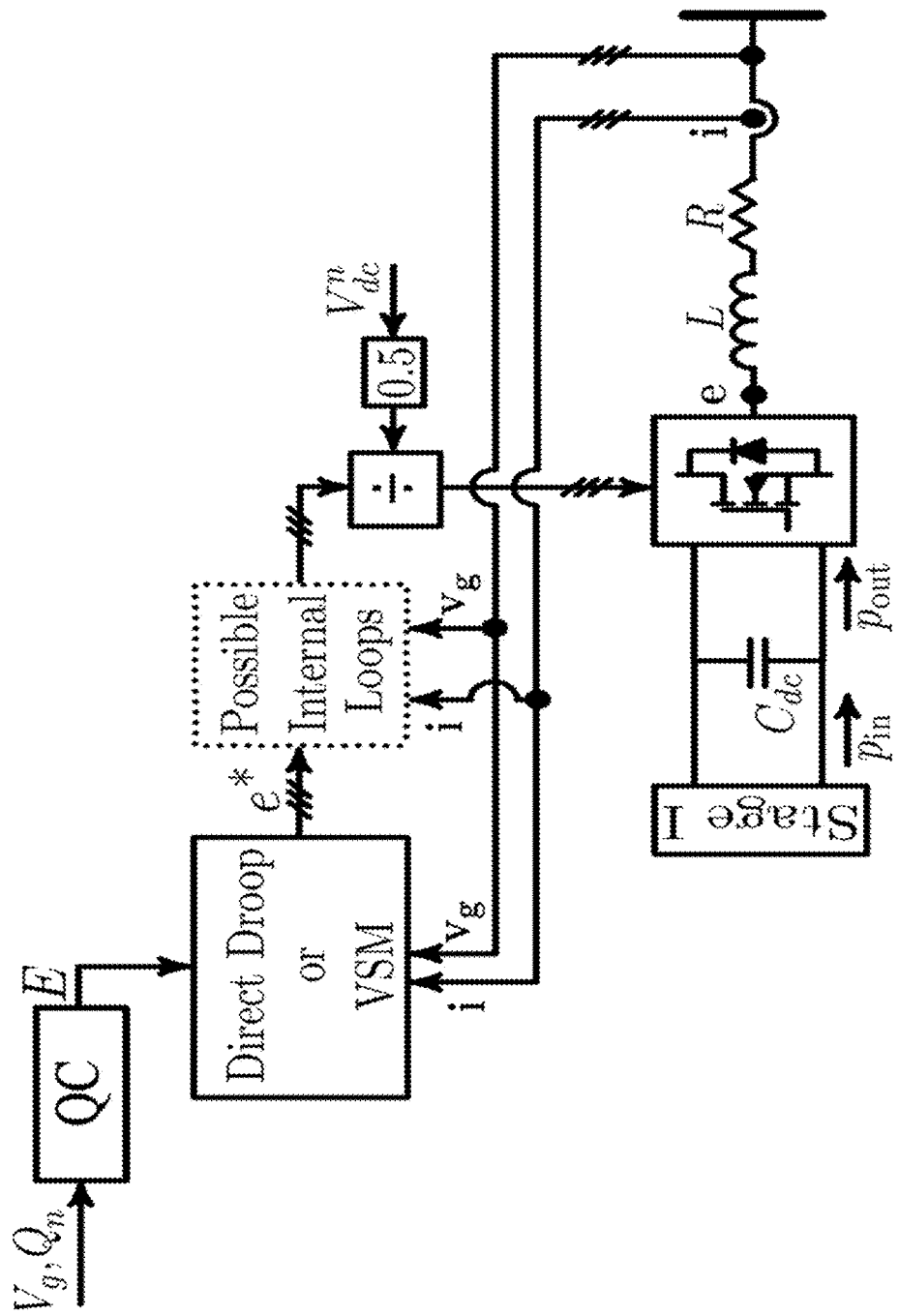
FIG. 2D illustrates a block diagram of a prior art inverter using a voltage control method.
Figure 3A:
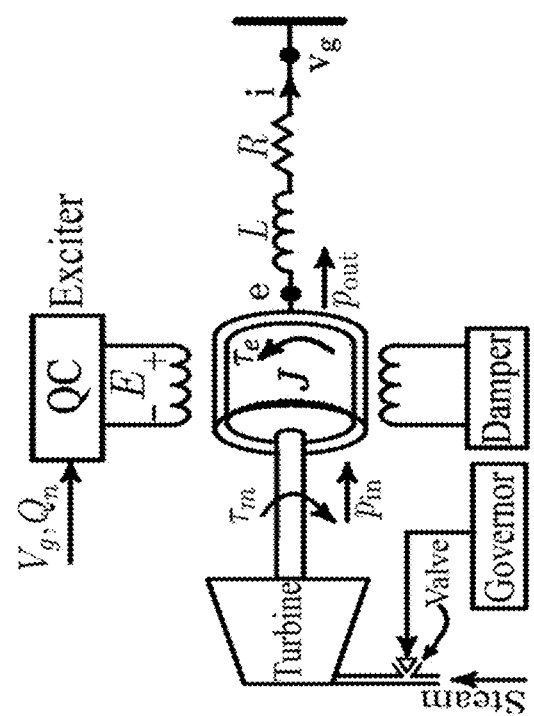
FIG. 3A is a block diagram of a prior art synchronous generator.
Figure 3B:
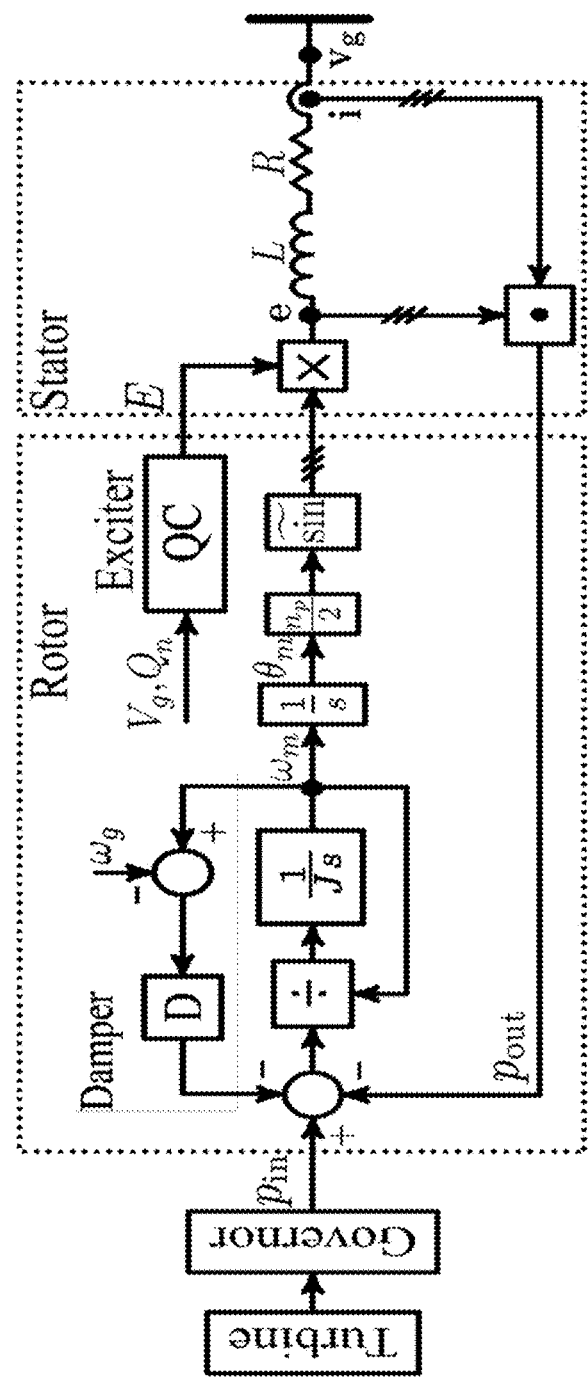
FIG. 3B is a block diagram of an equivalent model of the synchronous generator of FIG. 3A.
Figure 3C:
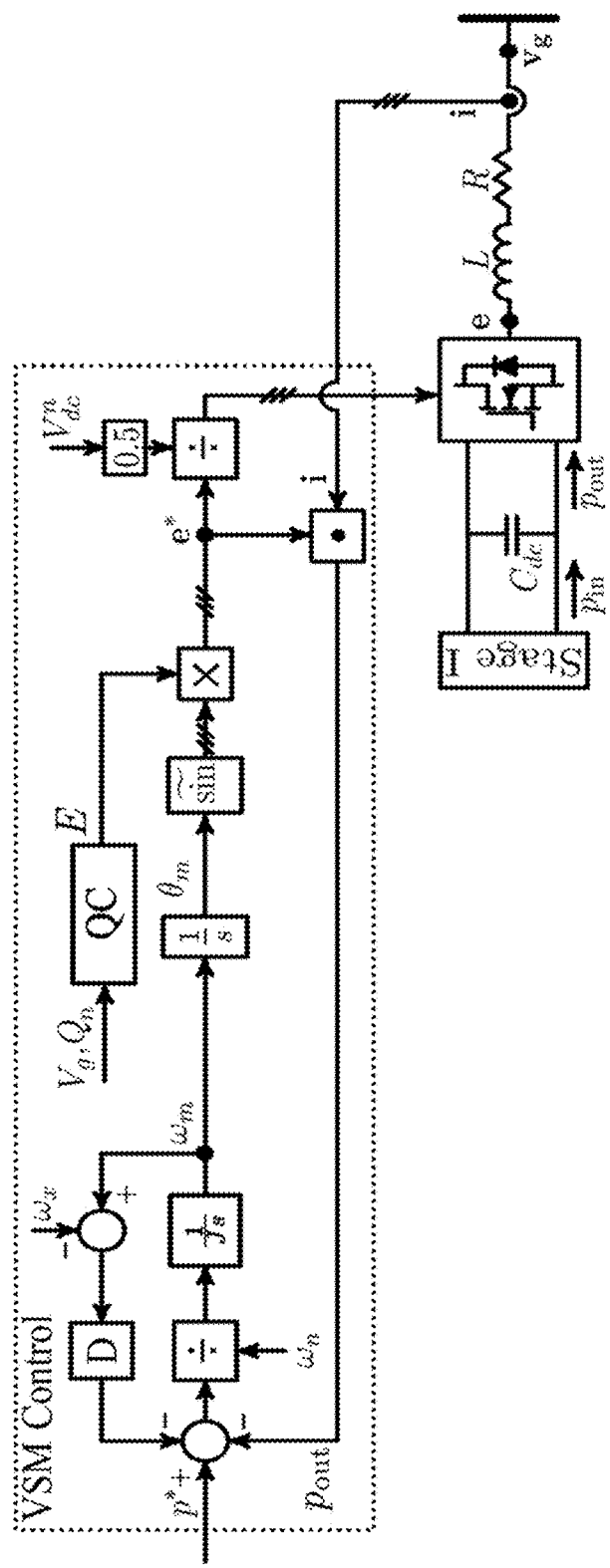
FIG. 3C is a block diagram of a prior art virtual synchronous machine.
Figure 3D:
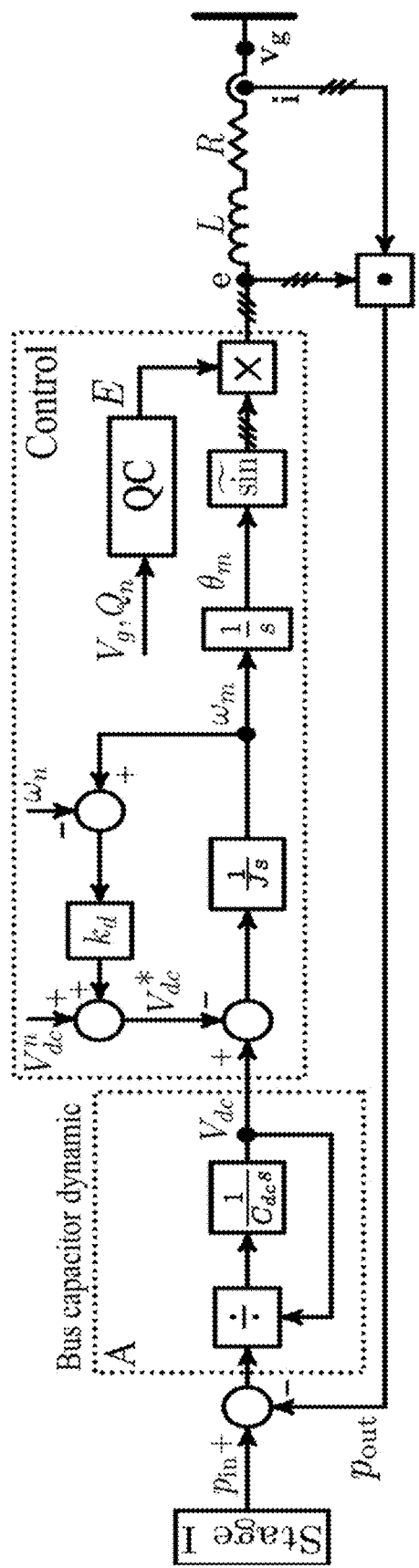
FIG. 3D is a block diagram of a prior art virtual synchronous machine applied to a two-stage converter.
Figures 4A, 4B:
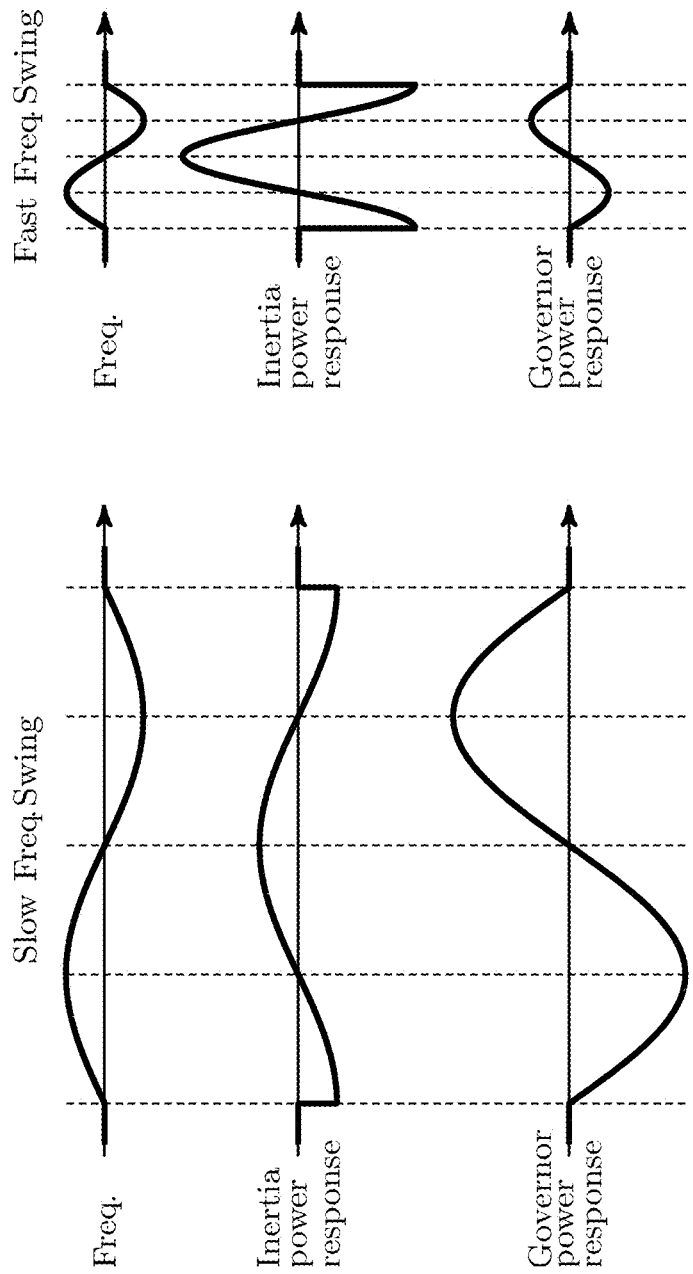
FIGS. 4A and 4B illustrate the prior art frequency response for inertial power and governor power for a slow frequency swing and a fast frequency swing, respectively.

The present invention has utility as an improved method and system for grid-supporting inverters for integration of distributed and renewable energy sources to a power grid. Unlike existing virtual synchronous machine (VSM) approaches, embodiments of the inventive inverter control approach, herein referred to as enhanced virtual synchronous machine (eVSM), do not duplicate the inertial loop or emulate the virtual inertia inside the controller, but deploys the physically existing inertia of the dc-link element. The eVSM employs an innovative method for enlarging the inertia utilization range which obviates the need for having a large dc-link element or a dedicated battery storage system, while still providing the same inertia response of an equivalent synchronous machine. Embodiments of the eVSM inverter controller use the physical dc-link capacitor dynamics for emulating the inertial response rather than relying on a dedicated battery storage or large dc element. Thus, embodiments of the eVSM implement the virtual inertia outside the controller using only the dc link capacitor, whereas existing VSM methods implement the inertia inside the controller. Existing VSM duplicate the inertia in the controller and the bus which will deviate from the synchronous machine model.

Embodiments of the eVSM provide stabilizing support to the grid that is similar to a synchronous machine despite the small size of the dc-link element in the eVSM. Moreover, transient responses of embodiments of the eVSM may be improved beyond those of conventional synchronous machines with the enhanced flexibility provided by adjusting damping and governor functions.

Embodiments of the invention provide control of an inverter. A simple yet effective method of controlling the inverter is provided that is based on the synchronous generator (SG) model, thereby providing dynamic performance similar to an SG. In this method, the rotor inertia is implemented using the intermediate dc-link capacitor, and rotor speed is mimicked with the capacitor voltage. By allowing the dc-link voltage to change within an enlarged yet admissible range and mapping the dc-link voltage into the controller as the internal frequency, the inventive method does not require a battery storage system (BSS) nor a large capacitor to emulate the rotor inertia. A self-synchronizing property prior to grid connection is achieved and improved stability margins, beyond those of synchronous machines, is made possible with embodiments of the eVSM.

As shown the existing VSM approach with ideal input power source and with proper governor and damper models can reproduce a virtual inertia behavior with the moment of inertia J that is implemented by the integrator $$\frac{1}{Js}$$

inside the VSM controller. However, when the existing VSM is applied to a converter with a bus capacitor and its related control systems, the incurred additional dynamics will deviate the emulated system from the targeted SG dynamics and its correct inertia response. It is further noted that in an SG, the moment of inertia corresponds to the physical rotor mass. To accurately emulate the SG in an inverter with a bus capacitor, the source of energy for the inertia should be a single component similar to the rotor mass in SG. Considering and comparing the two equations $$p_{in} - p_{out} = J \omega_m \dot{\omega}_m, p_{in} - p_{out} = C_{dc} V_{dc} \dot{V}_{dc} \qquad \text{Eq. 3}$$

it can be immediately observed that the bus capacitor in a two-stage inverter relates to the rotor mass in the SG. Therefore, unlike the existing VSMs, in embodiments of the eVSM there is no need for an additional integrator to emulate the rotating inertia as the capacitor in the hardware itself will emulate this inertia properly. This is the starting point to derive embodiments of a controller for an inverter in general and in particular in a double-stage inverter.

Figure 5A:
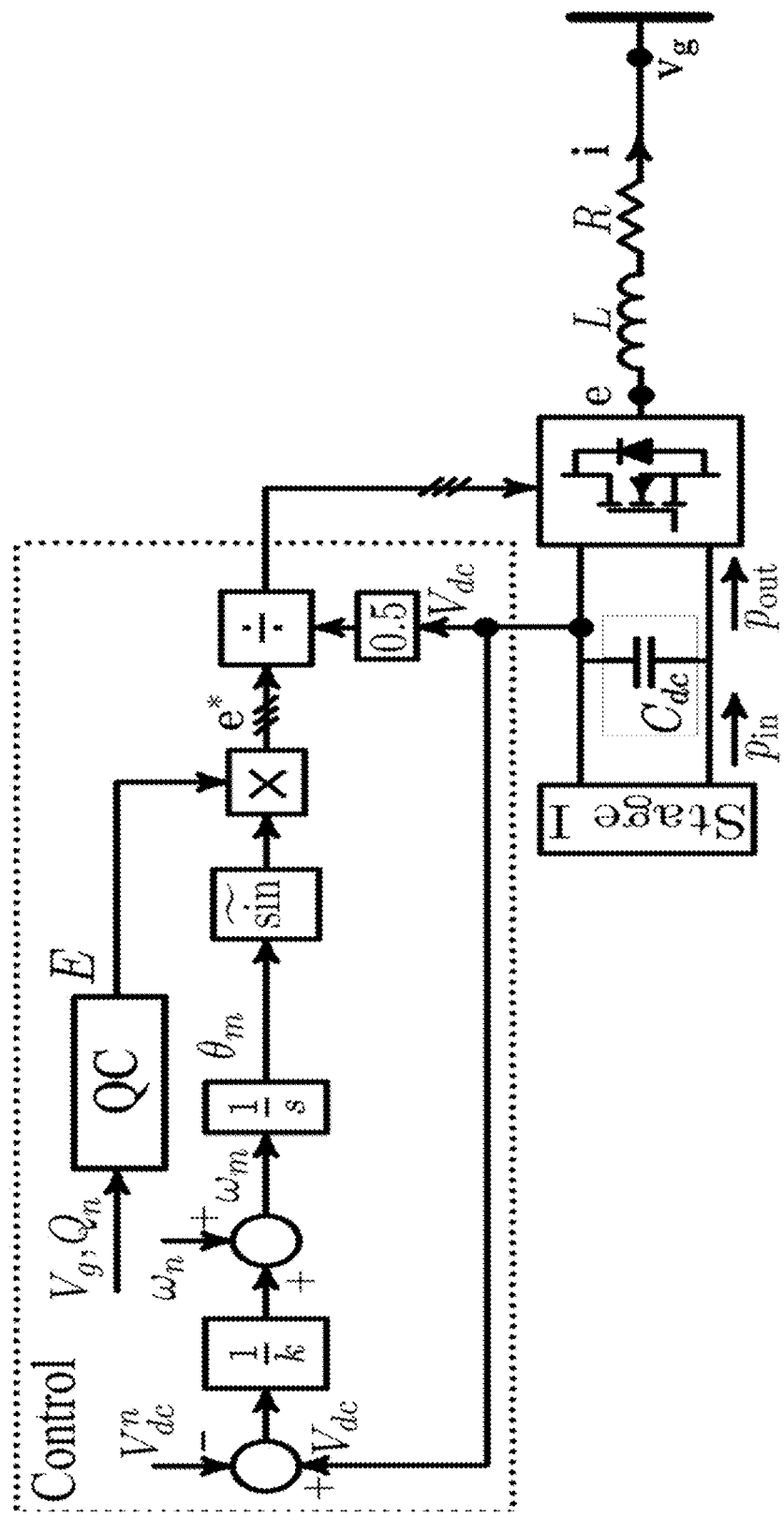
FIG. 5A is a block diagram of a converter and controller in accordance with embodiments of the invention.

A correspondence is established between the couplet (J, $\omega_m$) and ($C_{dc}$, $V_{dc}$) using a linear transformation as shown in FIG. 5A which is expressed by $$\omega_m = \omega_n + \frac{1}{k}(V_{dc} - V_{dc,n}). \qquad \text{Eq. 4}$$

It is shown below that this choice results in a moment of inertia equal to $$J = k\left(\frac{V_{dc,n}}{\omega_n}\right)C_{dc}.$$

Figure 5B:
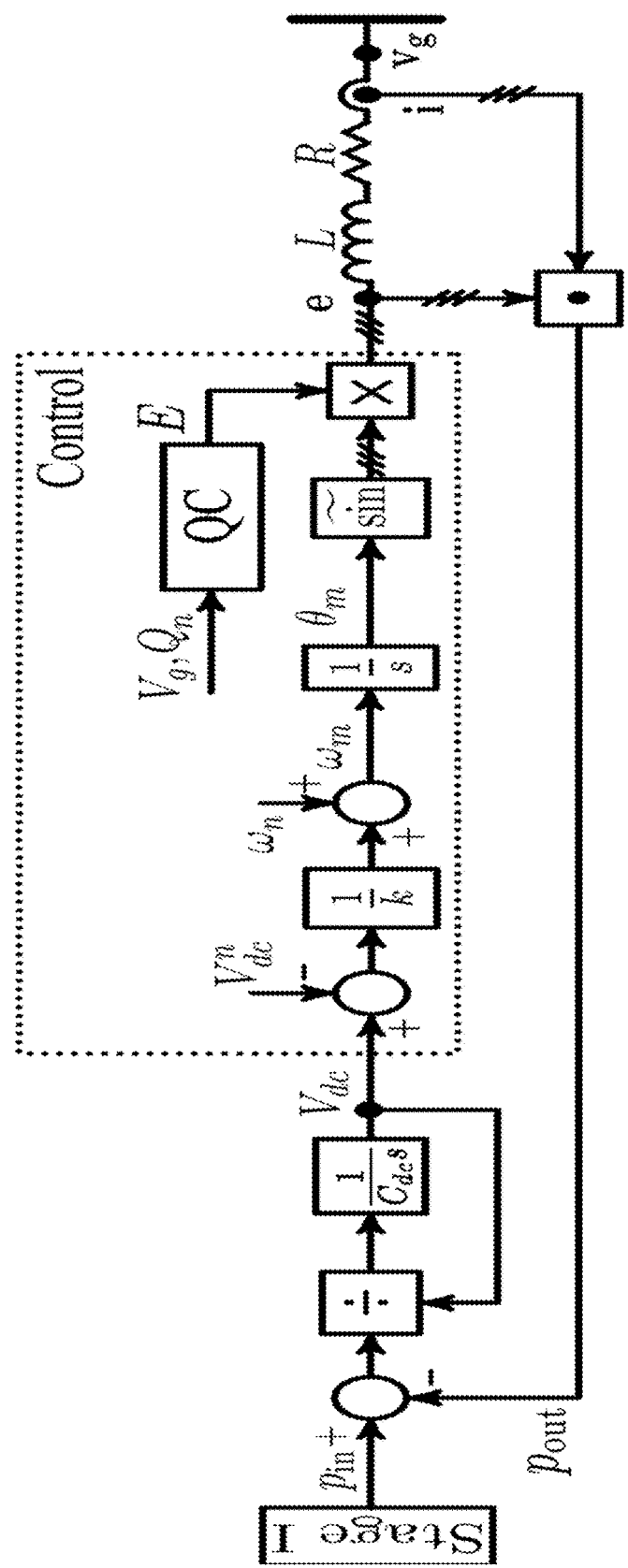
FIG. 5B is a block diagram of an overall equivalent model of the converter and controller of FIG. 5A in accordance with embodiments of the invention.

As shown in FIG. 5B, the dc link capacitor dynamics becomes identical to that of the rotor inertia in SG, while the rest of the system is identical to the SG, where $\omega_m$ is used to generate an inverter voltage with the amplitude coming from the QC block. This inverter voltage along with the grid voltage determines the inverter current passing through the filter's impedance. Therefore, the proposed method directly integrates the physical inertia coming from the dc bus capacitor. This is in contrast to the existing VSM methods where inertia is implemented inside the controller and duplicates that of the dc link capacitor.

It is further noted that as $V_{dc}$ is linked to the output frequency in embodiments of the inventive controller, the bus voltage will vary with the grid frequency. Therefore, the modulation index is scaled using the actual $V_{dc}$ value (not a nominal value) decouple the dc link voltage variations from the smooth and sinusoidal output voltage (23).

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

It is also appreciated that the virtual controls of the eVSM are software based, where the software is stored in a memory device in electrical communication with a computer processing unit. The instructions contained in the software are carried out by the processor of a computing device. The computing device may be a standalone computing device, or a computer on a chip illustratively including a microprocessor. The software may be stored in updatable random access memory or as firmware in read only memory.

Figure 6:
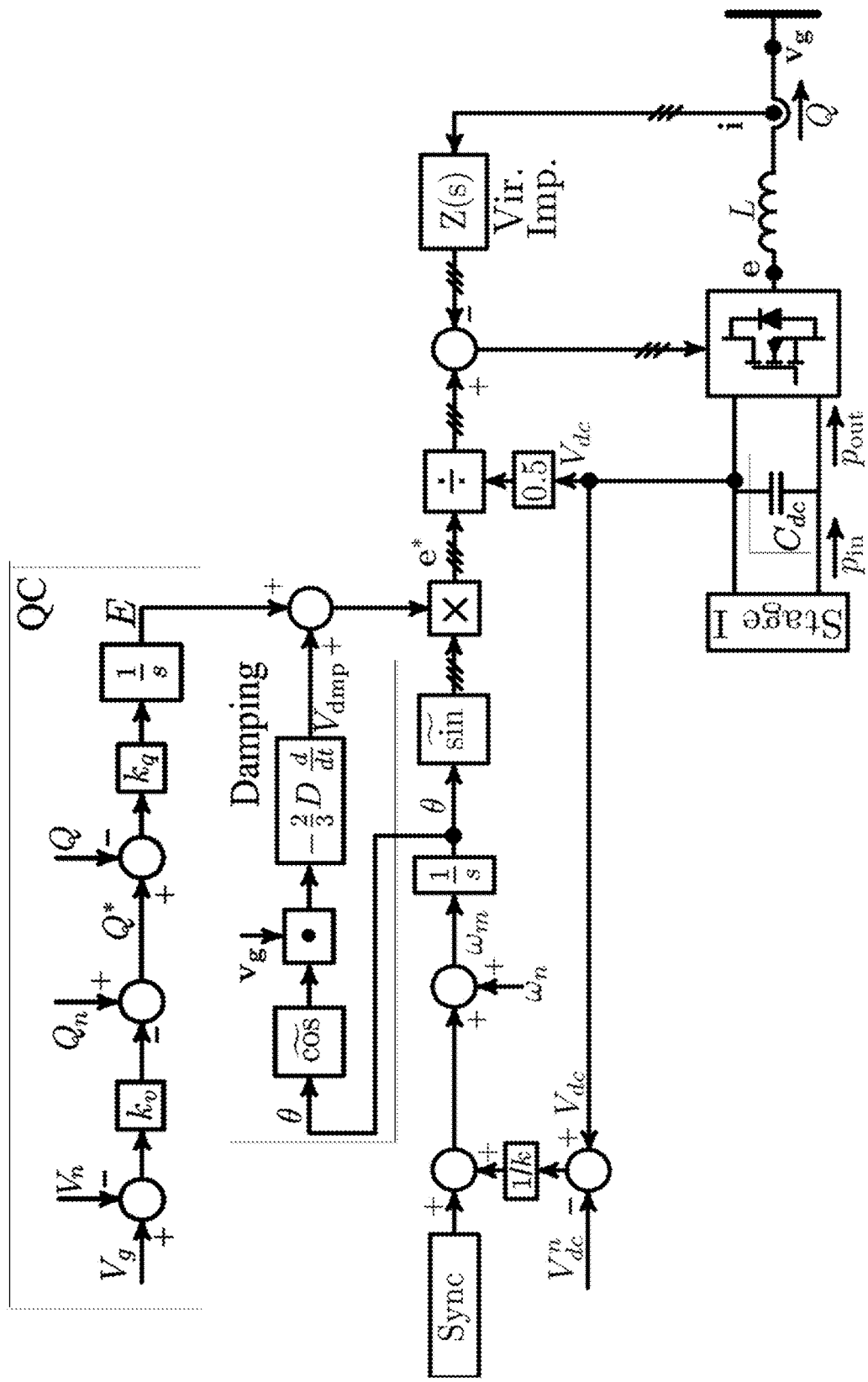
FIG. 6 is a block diagram of a converter and controller with axillary control blocks in accordance with embodiments of the invention.

Referring now to the figures, FIG. 6 illustrates a block diagram of an inventive embodiment of an eVSM controller with detailed auxiliary blocks including the QC block with voltage droop controller and the damping strategy. As may also be seen in FIG. 6, the concept of virtual impedance (Z(s)) may also be introduced to the embodiments of the inventive technique to provide a desired impedance at the output of the inverter. In the simplest form, Z(s) is a gain that represents a virtual resistance that enables achieving desirable stability margins without using physical lossy resistors at the output. It is also worth noting that embodiments of the inventive method do not need any phase lock loop (PLL) or any other measurement from the output angle or frequency In embodiments of the inventive eVSM controller, the SG damping term in the swing equation (2), $P_{dmp}=D(\omega_m-\omega_g)$ may also be added. Unlike the VSM methods, however, the point of applying $P_{dmp}$ is not available in embodiments of the inventive controller because the inertia-generating integrator is not inside the controller, but rather in the actual system. Therefore, $P_{dmp}$ has to be applied differently. As shown in FIG. 6, the damping scheme $P_{dmp}$ is translated into voltage amplitude, namely $V_{dmp}$, and is implemented at the output of the QC block. A shown in FIG. 6

$$V_{dmp} = -\frac{2}{3}D\frac{d}{dt}(\tilde{\cos}\theta \cdot v_g) = \qquad \text{Eq. 5}$$
$$-DV_g\frac{d}{dt}[\sin(\theta-\theta_g)] \approx DV_g(\omega_g-\omega_m)\cos(\theta-\theta_g).$$

This introduces a damping effect in the voltage magnitude E which in turn translates into $P_{dmp}$. It is worth noting that in embodiments of the inventive method the term ($\omega_m-\omega_g$) is calculated instantaneously with no dynamics without directly measuring or calculating $\omega_g$.

Continuing with FIG. 6, the reactive power control (QC) block controls the reactive power flow according to the voltage magnitude the same way an SG exciter does. The adopted voltage droop controller is given by $$Q^*=Q_n-k_v(V_g-V_n), \dot{E}=k_q(Q^*-Q) \qquad \text{Eq. 6}$$

The calculated reference Q* from equation 6 is then used to obtain the desired internal voltage amplitude E through an integrating unit the same way popular VSM methods such as (5), (6) do. The reactive power Q may be calculated using internal voltage variable according to $$Q = -E\tilde{\cos}\theta \cdot i = -E\cos\theta i_a - E\cos\left(\theta-\frac{2\pi}{3}\right)i_b - E\cos\left(\theta+\frac{2\pi}{3}\right)i_c$$

and the voltage amplitude $V_g$ is calculated according to $$V_g = \sqrt{-\frac{4}{3}(v_a v_b + v_b v_c + v_c v_a)}$$

or any other methods to estimate reactive power and voltage magnitude.

A self-synchronization procedure may be employed in embodiments of the invention. The self-synchronization procedure ensures smooth transition to GC mode. The method of (9), (10) is modified and used in embodiments of the inventive method as a cross product of the grid voltage and inverter voltage $$\text{Sync} = \left(\mu_1+\frac{\mu_2}{s}\right)(v_{o\alpha}v_{g\beta}-v_{o\beta}v_{g\alpha}) = \left(\mu_1+\frac{\mu_2}{s}\right)V_oV_g\sin(\phi_g-\phi_o) \qquad \text{Eq. 7}$$

is added as shown in FIG. 6 where $\alpha$ and $\beta$ indices denote the variables transformed to $\alpha\beta$ domain by the Clarke transformation, Vo is the output voltage amplitude, and $\phi_g$ and $\phi_o$ are the grid and output voltage phase angles. The signal sync in equation 7 is an index of synchronization, which is used to synchronize the inverter output voltage $v_o$ to grid voltage $v_g$ prior to connecting to the grid. Prior to the grid connection, due to the correspondence between the active power and $\omega_m$, the signal Sync may be adjusted so that $\phi_g$ and $\phi_o$ become equal. At this time, a grid connection switch can be closed. Subsequently, $v_o=v_g$ and the signal Sync will reset to zero.

In inventive embodiments of the eVSM controller, the internal frequency and the dc-link voltage are coupled through equation 4. There are two key points to this relationship: (i) the dc-link voltage is shaped to follow the grid frequency because the internal frequency has to closely follow the grid frequency, and (ii) the dc-link voltage will satisfy $\dot{V}_{dc}=k\,\dot\omega_m$ which can be shown to amplify the inertia utilization. To clarify the second point, assume that the center dc-link voltage is $V_{dc,n}=k_o\omega_n$. Then, the inertia power of the proposed PV system is equal to $$C_{dc}V_{dc}\dot{V}_{dc} \approx C_{dc}V_{dc,n}\dot{V}_{dc} = C_{dc}k_ok\omega_n\dot\omega_m \approx (C_{dc}k_ok)\omega_m\dot\omega_m = J\omega_m\dot\omega_m, \quad \text{Eq. 8}$$

where $$J=(k_ok)C=KC. \quad \text{Eq. 9}$$

Equation (9) signifies an inertia utilization amplification with gain $K=k_ok$. The first gain, $k_o$, depends on the value of the center dc-link voltage $V_{dc,n}$. For a 500 V dc-link voltage in a 60 Hz system, for instance, $k_o$ is equal to $500/377=1.33$. The second gain, $k$, depends on the allowable range of swings of the dc-link voltage. In practice, this gain can be selected relatively large without violating the practical constraints of the system. For instance, for a 120 V (rms) line to neutral 3-phase grid and a center dc-link voltage of $V_{dc,n}=500$ V, the physical limitations of the VSC require that the grid peak voltage $120\sqrt{2}\approx170$ V remain below $$\frac{V_{dc,n}}{2} = 250 \text{ V}.$$

Even if a margin of about 20 V is left for this limit, the dc-link voltage can still have a dynamic range of ±60 V around its center value. If the grid frequency range of variations is ±0.5 Hz, that is ±3.14 rad/s, this means k is approximately equal to 20. With this set of numbers, the moment of inertia amplification gain K will be about 26.

Inertia energy source management may be conducted as follows in embodiments of the inventive eVSM. The source of energy to supply the inertia in an SG is dominantly the rotor mass and normally this inertia energy cannot be taken from the input mechanical source as its time constant does not allow it. Embodiments of the inventive controller have made this distinction and follows the same rule and takes the inertia energy from the bus capacitor. However, in cases where the input source time constant allows it, such as the case of photovoltaic (PV) or battery sources, the inertia energy may be managed to be partially provided from the input source. Assume that the desired total emulated moment of inertia is $J_{total}$ and the amount of the moment of inertia provided by bus capacitor in the proposed controller is $J=KC$. Therefore, $J_{total}=J+J_{in}$, where $J_{in}$ is the moment of inertia supply by the input stage. In this case, the desired swing equation for the system is $p_{in}-p_{out}=J_{total}\omega_m\dot\omega_m=J\omega_m\dot\omega_m+J_{in}\omega_m\dot\omega_m$. This can be achieved by adding $-J_{in}\omega_m\dot\omega_m$ to the reference of the input power.

Design of synchronization block gains, $\mu_1$ and $\mu_2$, may be carried out used phase lock loop (PLL) theory, because it is readily observed that the VSM is very similar to a PLL during pre-synchronization. Therefore, the set of values for $\mu_1$ and $\mu_2$ may be derived as $$\left(\mu_1 + \frac{\mu_2}{s}\right) = \frac{1}{V_n^2}\left(100 + \frac{1}{0.05s}\right) \quad \text{Eq. 10}$$

EXAMPLES

Example 1

Figure 8:
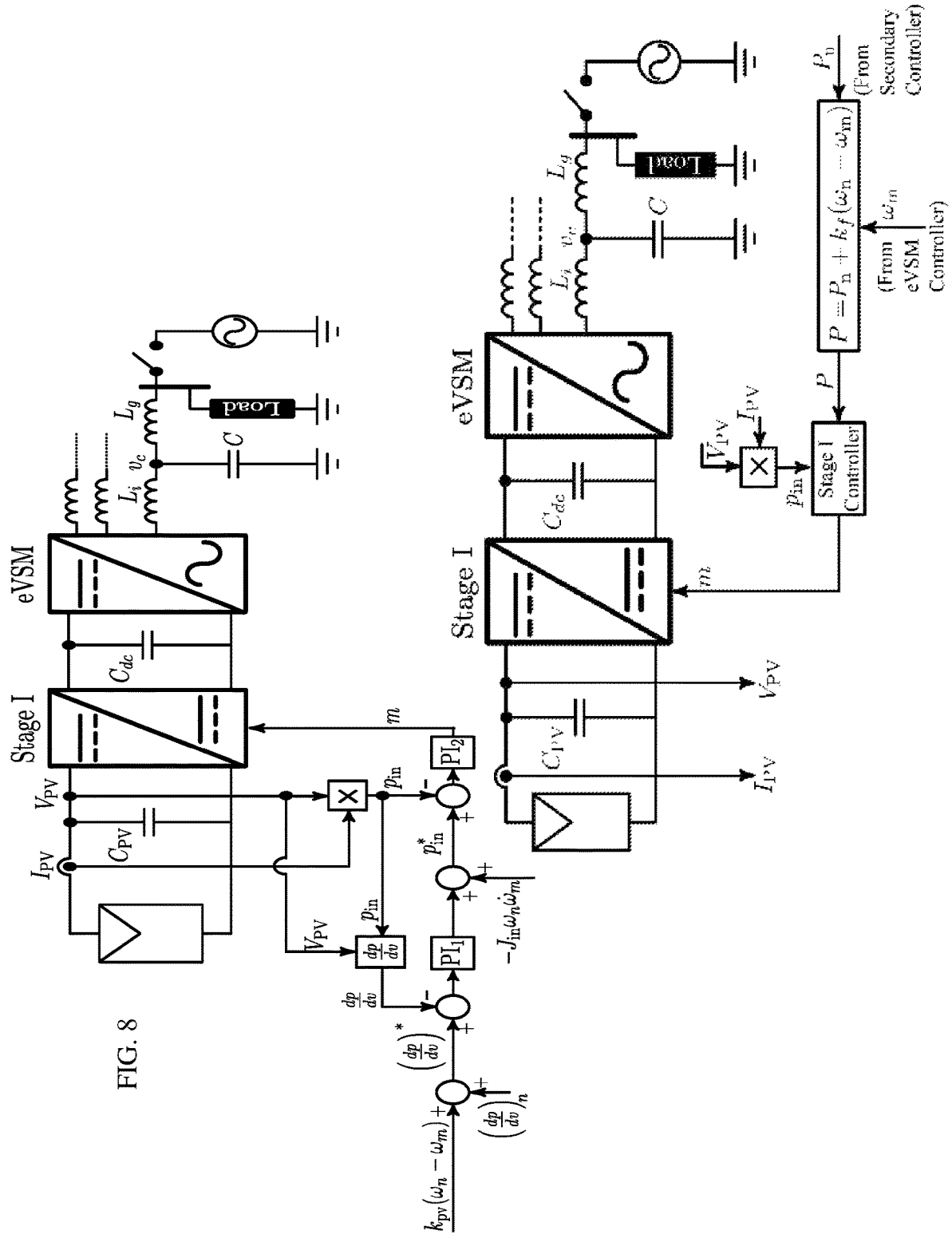
FIG. 8 is a block diagram the enhanced virtual synchronous machine (eVSM) applied to a two-stage photovoltaic (PV) system her accordance with an embodiment of the invention

Embodiments of the proposed method for an eVSM may be applied to any two-stage converter system. As an example, a two-stage photovoltaic (PV) system is shown in FIG. 8. One challenge in renewable applications in general is the uncertainty and variability of the input available power. In PV systems, it is desirable to operate as close as possible to the unknown maximum power point (MPP) during normal system operations. To address this issue, the embodiment method of FIG. 8 uses a control loop over the variable $$\frac{dp}{dv}$$

to regulate the PV system to $$\left(\frac{dp}{dv}\right)_n + k_{pv}(\omega_n - \omega_m).$$

This mechanism will operate the PV at a point slightly on the right side of the MPP determined by $$\left(\frac{dp}{dv}\right)_n$$

as long as the grid frequency is close to the nominal value. Similar to the governor of an SG, this loop will adjust the input power according to a droop characteristic ($k_{pv}$) with respect to the internal grid frequency variable ($\omega_m$). A first $PI_1$ with a slow time constant is used to emulate the slow behavior of an SG governor.

As observed in FIG. 8, the optional input inertia term $-J_{in}\omega_m\dot\omega_m$ can be added to the input power reference $p_{in}^*$ and a fast $PI_2$ controller is used to allow tracking of a power reference up to the desired frequency band of the inertia.

Example 2

A stability analysis of the embodiment of the inventive control system shown in FIG. 6 is performed to obtain system parameters.

Differential equations of the system shown in FIG. 6 are summarized as follows:

$$\dot{W}_{dc} = p_{in} - p_{out} = p_{in}(E + V_{dmp})i_d \quad \text{Eq. 11}$$

$$\dot{E} = k_q(Q^* - Q) = k_q(Q^* + Ei_q)$$

$$\frac{d}{dt}i_d = -\frac{R}{L}i_d + \frac{1}{L}(E + V_{dmp}) - \frac{1}{L}V_{gd} + \omega_m i_q$$

-continued $$\frac{d}{dt}i_q = -\frac{R}{L}i_q - \frac{1}{L}V_{gd} - \omega_m i_d$$

$$\dot{\delta} = \omega_g - \omega_m, \delta = \theta_g - \theta$$ 5 where $W_{dc} = \frac{1}{2}C_{dc}V_{dc}^2$, the variables are transformed to the dq-frame using the internal angle θ, and it is assumed that the virtual impedance is equal to R. The damping term is calculated according to $$V_{dmp} = -\frac{2}{3}D\frac{d}{dt}v_g \cdot \cos\theta = -\frac{2}{3}D\frac{d}{dt}\left(\frac{3}{2}V_g\sin(\theta_g - \theta)\right) = -DV_g(\omega_g - \omega_m)\cos\delta$$ 15 and the grid voltage dq components are $V_{gd} = V_g \cos\delta$, $V_{gq} = V_g \sin \delta$. It is also noted that $\dot{W}_{dc} = CV_{dc}\dot{V}_{dc} = Ck[V_{dc,n} + k(\omega_m - \omega_n)]\dot{\omega}_m$, and substituting in equation 10 gives, $$\dot{\omega}_m = \frac{1}{Ck}[p_{in} - Ei_d + DV_g i_d(\omega_g - \omega_m)\cos\delta]/[V_{dc,n} + k(\omega_m - \omega_n)]$$ Eq. 12

$$\dot{E} = k_q(Q^* - Q) = k_q[Q_n + k_v(V_n - V_g) + Ei_q]$$

$$\dot{\delta} = \omega_g - \omega_m$$

$$\dot{i}_d = -\frac{R}{L}i_d + \frac{1}{L}[E - DV_g(\omega_g - \omega_m)\cos\delta] - \frac{1}{L}V_g\cos\delta + \omega_m i_q$$

$$\frac{d}{dt}i_q = -\frac{R}{L}i_q - \frac{1}{L}V_g\sin\delta - \omega_m i_d.$$

Equation set 12 represents a fifth order nonlinear system with state variables $(\omega_m, E, \delta, i_a, i_g)$. For every given set of values of $(p_{in}, Q_n)$, the equilibrium point of the equations may be derived and used in linear stability analysis using the Jacobian linearization method. Assuming that the grid frequency/voltage is at its rated, $\omega_g = \omega_n$, $V_g = V_n$, and the equilibrium point is given by $(\omega_g, E_o, \delta_o, i_{ao}, i_{qo})$, the Jacobian matrix will be given by $$\begin{bmatrix} -\frac{DV_g i_{do}}{CkV_{dc,n}}\cos\delta_o & -\frac{i_{do}}{CkV_{dc,n}} & 0 & -\frac{E_o}{CkV_{dc,n}} & 0 \\ 0 & k_q i_{qo} & 0 & 0 & k_q E_o \\ -1 & 0 & 0 & 0 & 0 \\ i_{qo} + \frac{DV_g}{L}\cos\delta & \frac{1}{L} & \frac{V_g}{L}\sin\delta_o & -\frac{R}{L} & \omega_g \\ -i_{do} & 0 & -\frac{V_g}{L}\cos\delta_o & -\omega_g & -\frac{R}{L} \end{bmatrix}$$

To obtain the equilibrium point, it is noted that the first equation implies $E_o i_{do} = p_{in}$, the second one implies $E_o i_{qo} = -Q_n$, the fourth and fifth equations imply $E_o - Ri_{do} + L\omega_g i_{qo} = V_g \cos \delta_o$ and $L\omega_g i_{do} + Ri_{qo} = -V_g \sin \delta_o$. Thus, $$(E_o - Ri_{do} + L\omega_g i_{qo})^2 + (L\omega_g i_{do} + Ri_{qo})^2 = V_g^2 \Rightarrow (E_o^2 - Rp_{in} - L\omega_g Q_n)^2 + (L\omega_g p_{in} - RQ_n)^2 = V_g^2 E_o^2$$

which leads to the second-order polynomial versus $E_o^2$. Thus, $E_o$ is calculated according $$E_o = \sqrt{\left(A + \frac{1}{2}V_g^2\right) + \sqrt{\left(A + \frac{1}{2}V_g^2\right)^2 - A^2 - B}},$$

$$A = Rp_{in} + L\omega_g Q_n, B = (L\omega_g p_{in} - RQ_n)^2.$$

When $E_o$ is calculated, other variables are also easily calculated from the above relationships.

Three controller parameters are R, D and $k_q$. Let us define $$R = \beta_1 X \text{ and } k_q = \beta_2 \frac{\omega_g}{3V_g}X.$$

Figure 7A:
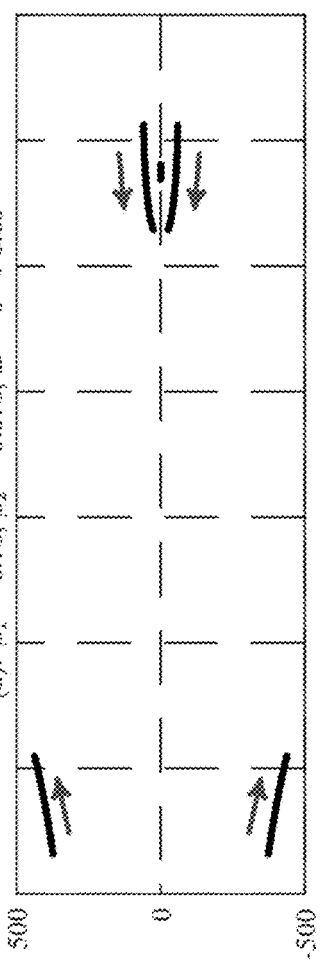
FIGS. 7A-C are a series of graphs showing the loci of eigenvalues of linearized system J versus three controller gains in accordance with embodiments of the invention.
Figure 7B:
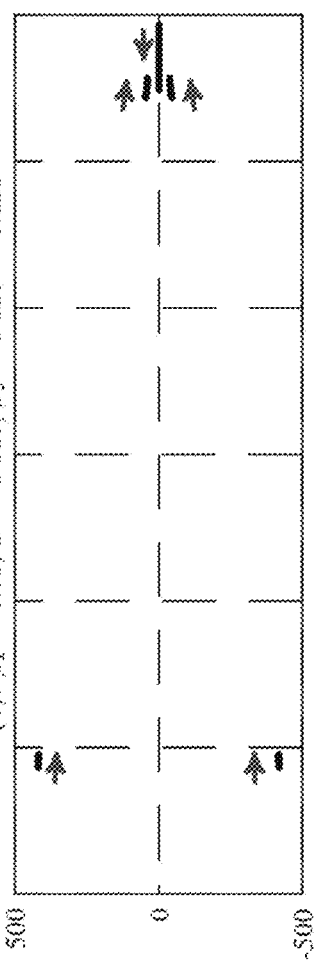
Figure 7C:
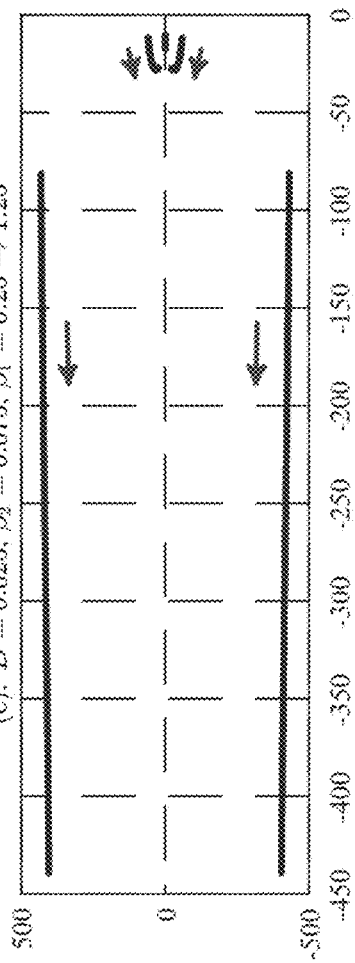

These definitions normalize the three controller parameters and facilitates a more general design stage. With this definition, it was shown that $0.25 < \beta_1 < 1.25$ and $0.025 < \beta_2 < 0.125$ result in desirable performances. The damping gain D is already normalized. Here a value between 2 to 5%, $0.02 < D < 0.05$, is a desired selection. FIG. 7A shows the loci of eigenvalues of J when $\beta_1 = 0.75$, $\beta_2 = 0.075$ and D is varied from 0 to 0.05. The strong stabilizing effect of D is clearly observed from the graph. FIG. 7B shows the case where $\beta_1 = 0.75$, D=0.025 and $\beta_2$ is varied from 0.025 to 0.125. This parameter mainly shifts the automatic voltage regulator (AVR) real pole to the left side (as expected). However, it will also slightly shift the two other low frequency complex poles to the right. Finally, FIG. 7C shows the case where $\beta_2 = 0.075$, D=0.025 and $\beta_1$ varied from 0.25 to 1.25. This is the impact of virtual resistance which pushes all the poles towards the left. However, excessive increase of this parameter will cause a return of two low-frequency complex poles towards the right side. This study concludes a suggested set of values $\beta_1 = 1$, $\beta_2 = 0.1$, D=0.03 that results in the location of poles at $-340 \pm j418$, $-20 \pm j19$, $-45$.

Example 3

A stability analysis of the control system when the output filter is extended to an LCL topology was performed. Similar to the L filter case, differential equations of proposed system of FIG. 6 with LCL filter are obtained as:

$$\dot{\omega}_m = \frac{1}{C_{dc}k}\frac{p_{in} - Ei_d - V_{dmp}i_d}{V_{dc,n} + k(\omega_m - \omega_n)},$$ Eq. 13

$$\dot{E} = k_q(Q^* - Q) = k_q[Q_n + k_v(V_n - V_g) + Ei_q],$$

$$\dot{\delta} = \omega_g - \omega_m,$$

$$\dot{i}_d = -\frac{R}{L}i_d + \frac{1}{L}(E + V_{dmp}) - \frac{1}{L}v_{cd} + \omega_m i_q,$$

$$\dot{i}_q = -\frac{R}{L}i_q - \frac{1}{L}v_{cq} - \omega_m i_d,$$

$$\dot{i}_{gd} = \frac{1}{L_g}(v_{cd} - V_g\cos\delta) + \omega_m i_{gq},$$

$$\dot{i}_{gq} = \frac{1}{L_g}(v_{cq} - V_g\sin\delta) - \omega_m i_{gd},$$

$$\dot{v}_{cd} = \frac{1}{C}(i_d - i_{gd}) + \omega_m v_{cq},$$

$$\dot{v}_{cq} = \frac{1}{C}(i_q - i_{gq}) - \omega_m v_{cd},$$

$$\dot{V}_{dmp} = -\frac{1}{\tau}V_{dmp} - \frac{1}{\tau}DV_g(\omega_g - \omega_m)\cos\delta.$$

The capacitor voltage of LCL filter is $v_c$ and its capacitance is C. The grid side current is $i_g$ and its inductance is $L_g$. Equation set (13) represents a tenth order nonlinear system with state variables ($\omega_m$, E, $\delta$, $i_d$, $i_q$, $i_{gd}$, $i_{gq}$, $v_{ed}$, $v_{eq}$, $V_{dmp}$). Similar to the L filter analysis, the Jacobian linearization method is used. Assuming that the grid frequency/voltage is at its rated, the equilibrium point is given by ($\omega_g$, $E_o$, $\delta_o$, $i_{do}$, $i_{qo}$, $i_{gdo}$, $i_{gqo}$, $v_{cdo}$, $v_{cqo}$, 0). To obtain the equilibrium point, the equations imply:

$$E_o i_{do} = p_{in}, \quad E_o i_{qo} = -Q_n,$$

$$v_{cdo} = E_o - R i_{do} + L\omega_g i_{qo} = E_o - (Rp_{in} + L\omega_g Q_n)E_o^{-1}$$
$$= E_o - AE_o^{-1},$$

$$v_{cqo} = -R i_{qo} - L\omega_g i_{do} = (RQ_n - L\omega_g p_{in})E_o^{-1} = bE_o^{-1},$$

$$b = RQ_n - L\omega_g p_{in},$$

$$v_{cdo} + L_g\omega_g i_{gqo} = V_g \cos\delta_o, \quad v_{cqo} - L_g\omega_g i_{gdo} = V_g \sin\delta_o,$$

$$i_{gdo} = i_{do} + C\omega_g v_{cqo} = (p_{in} + C\omega_g b)E_o^{-1},$$

$$i_{gqo} = i_{qo} - C\omega_g v_{cdo} = -C\omega_g E_o - (Q_n - C\omega_g A)E_o^{-1} \Rightarrow$$

$$(v_{cdo} + L_g\omega_g i_{gqo})^2 + (v_{cqo} - L_g\omega_g i_{gdo})^2 =$$

$$V_g^2 \Rightarrow \{(1 - L_g C\omega_g^2)E_o - [A(1 - L_g C\omega_g^2) + L_g\omega_g Q_n]E_o^{-1}\}^2 +$$

$$\{[(1 - L_g C\omega_g^2)b - L_g\omega_g p_{in}]E_o^{-1}\}^2 =$$

$$V_g^2 \Rightarrow \{(1 - L_g C\omega_g^2)E_o^2 - [A(1 - L_g C\omega_g^2) + L_g\omega_g Q_n]\}^2 +$$

$$\{[(1 - L_g C\omega_g^2)b - L_g\omega_g p_{in}]\}^2 =$$

$$V_g^2 E_0^2 \Rightarrow (\gamma E_o^2 - A\gamma - L_g\omega_g Q_n)^2 + (\gamma b - L_g\omega_g p_{in})^2 = V_g^2 E_o^2,$$

$$\gamma = 1 - L_g C\omega_g^2 \Rightarrow (E_o^2 - A - L_g\omega_g Q_n\gamma^{-1})^2 + (b - L_g\omega_g p_{in}\gamma^{-1})^2 =$$

$$V_g^2 \gamma^{-2} E_o^2$$

Comparing with the similar equation derived for L filter in Example 2 above and its solution, here the solution is $$E_o = \sqrt{\left(\overline{A} + \frac{1}{2}\overline{V}_g^2\right) + \sqrt{\left(\overline{A} + \frac{1}{2}\overline{V}_g^2\right)^2 - \overline{A}^2 - \overline{B}}}$$

where $$\overline{V}_g = V_g \gamma^{-1}, \overline{A} = A + L_g\omega_g Q_n\gamma^{-1}, \overline{B} = (b - L_g\omega_g p_{in}\gamma^{-1})^2.$$

By calculating $E_O$, other variables are obtained from the above relationship. The Jacobian matrix ($\Gamma$) is given by:

$$\begin{bmatrix} 0 & -\dfrac{i_{do}}{C_{dc}kV_{dc,n}} & 0 & -\dfrac{E_o}{C_{dc}kV_{dc,n}} & 0 & 0 & 0 & 0 & 0 & -\dfrac{i_{do}}{C_{dc}kV_{dc,n}} \\ 0 & k_q i_{qo} & 0 & 0 & k_q E_o & 0 & 0 & 0 & 0 & 0 \\ -1 & 0 & 0 & 0 & 0 & 0 & 0 & 0 & 0 & 0 \\ i_{qo} & \dfrac{1}{L} & 0 & -\dfrac{R}{L} & \omega_g & 0 & 0 & -\dfrac{1}{L} & 0 & \dfrac{1}{L} \\ -i_{do} & 0 & 0 & -\omega_g & -\dfrac{R}{L} & 0 & 0 & 0 & -\dfrac{1}{L} & 0 \\ i_{gqo} & 0 & \dfrac{V_g}{L_g}\sin\delta_o & 0 & 0 & 0 & \omega_g & \dfrac{1}{L_g} & 0 & 0 \\ -i_{gdo} & 0 & -\dfrac{V_g}{L_g}\cos\delta_o & 0 & 0 & -\omega_g & 0 & 0 & \dfrac{1}{L_g} & 0 \\ v_{cqo} & 0 & 0 & \dfrac{1}{C} & 0 & -\dfrac{1}{C} & 0 & 0 & \omega_g & 0 \\ -v_{cdo} & 0 & 0 & 0 & \dfrac{1}{C} & 0 & -\dfrac{1}{C} & -\omega_g & 0 & 0 \\ \dfrac{D}{\tau}V_g\cos\delta_o & 0 & 0 & 0 & 0 & 0 & 0 & 0 & 0 & -\dfrac{1}{\tau} \end{bmatrix}$$

Figure 10:
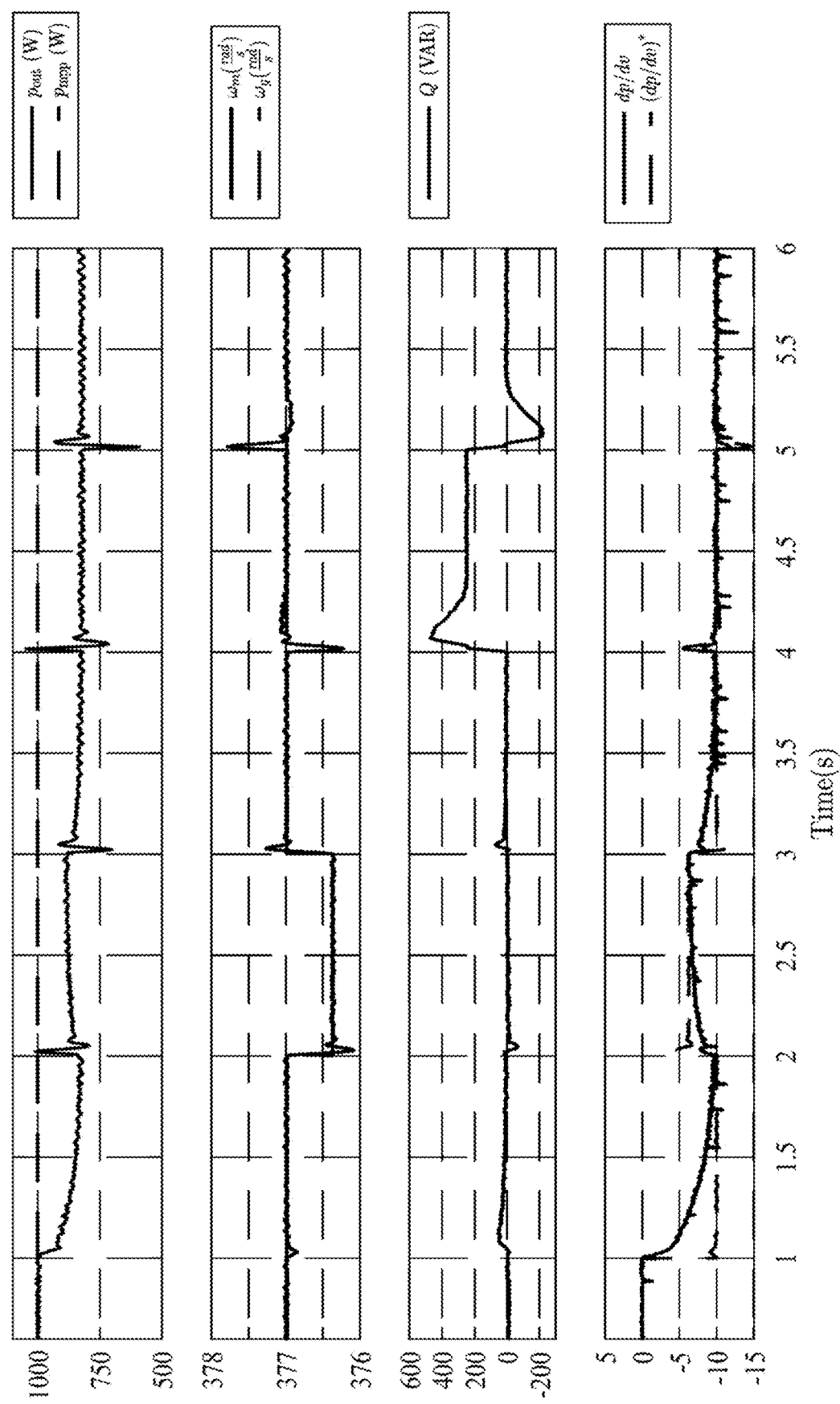
FIG. 10 is a series of graphs illustrating simulation results of the eVSM for input power, grid frequency, and grid amplitude jump (t<6)

FIG. 10 shows the loci of system eigenvalues with LCL filter versus changes in the grid inductance. In this figure, $L_g$ changes from 1 mH to 0.1 mH and from 1 mH to 5 mH. It is observed that although $L_g$ changes over a wide range, eigenvalues of the system are not drastically changed and it remains stable. Notice that the decrease in the damping of resonance pole does not cause a problem as it is accompanied with an increase in the resonance frequency [26].

Example 4

A simulation was performed to determine the performance of an embodiment of the eVSM controller. System parameter are presented in Table 1.

TABLE 1

| System parameters | | |
|---|---|---|
| Dc link nominal voltage | $V_{dc, n}$ | 430 V |
| Dc link capacitor | $C_{dc}$ | 880 μF |
| Grid LN voltage (peak) | $V_g$ | $120\sqrt{2}$ V |
| Inverter power rating | S | 1 kVA |
| Grid frequency | f | 60 Hz |
| Switching frequency | $f_s$ | 10 kHz |
| Filter Parameters | $L_i$ | 5 mH |
| | C | 2 μF |

Figure 9:
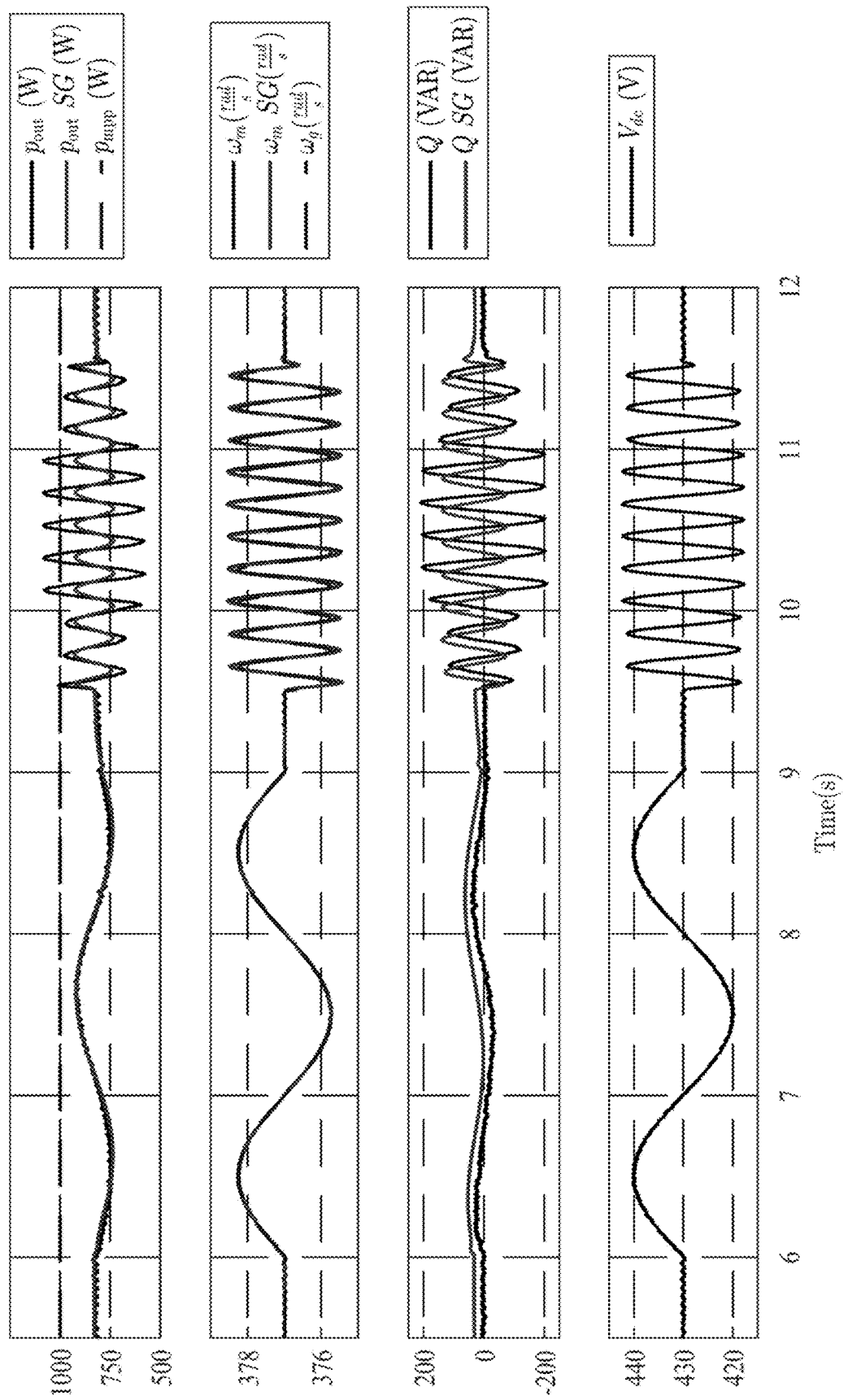
FIG. 9 is a series of graphs illustrating simulation results comparing inertial behavior of the eVSM controller with SG (6<t<11.5) in accordance with embodiments of the invention.
Figure 11:
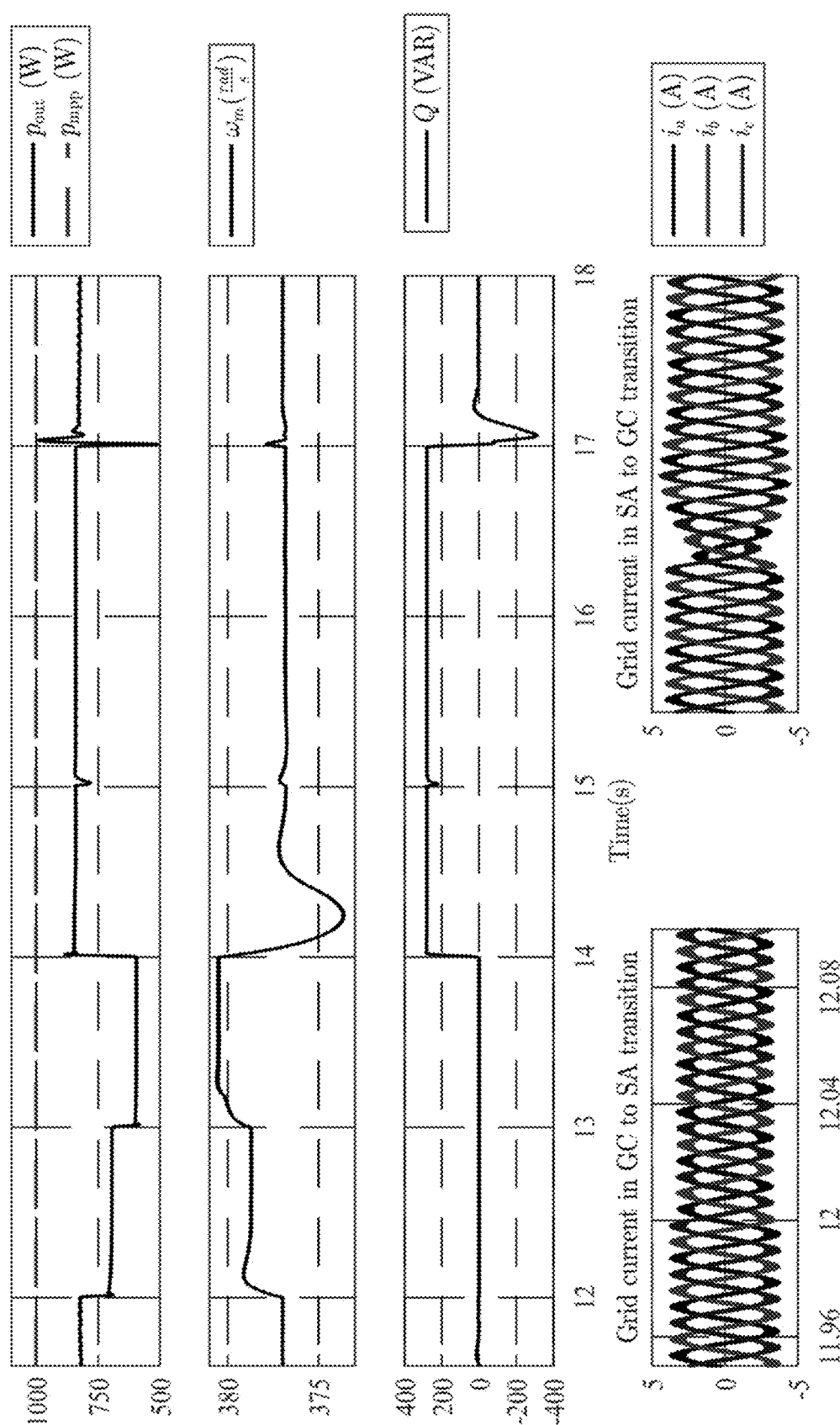
FIG. 11 is a series of graphs illustrating simulation results of the eVSM during standalone (SA) and transition to grid-connected (GC) operation (12<t<18)

The simulation of the embodiment of the eVSM controller was conducted under the following conditions:
0<t<1: MPPT operation $$\left(\frac{dp}{dv} = 0, P = P_{mpp} = 1000 \text{ W}\right)$$

t=1:

$$\left(\frac{dp}{dv}\right)^* \text{ jump of } -10.$$

t=2: grid frequency jump of −0.1 Hz
t=3: grid frequency jump of 0.1 Hz
t=4: grid magnitude jump of −2.5%
t=5: grid magnitude jump of 2.5%
6<t<9: slow grid frequency swing (0.5 Hz frequency, 0.2 Hz peak)
9.5<t<11.5: fast grid frequency swing (5 Hz frequency, 0.2 Hz peak)
10<t<11: input inertia command enabled
t=12: islanding (initial resistive load of 700 W)
t=13: 100 W load shedding
t=14: 255 W/255 Var load addition
t=16: pre-synchronization enabled
t=18: reconnection to grid Based on the supplied parameter it was observed as shown in FIGS. 9-11, the controller perfectly responded to the grid and the source transients in a stabilizing manner and settled in the new operating point. Correspondence between the $\omega_m$ and $V_{dc}$ can also be seen in this test. It is also observed that the controller regulates its output power when there is a jump in the input power, while $V_{dc}$ and $\omega_m$ return to their steady-state values prior to this jump. The inertia utilization amplification, the inertia source management stage, distinction between the inertia and governor transients, grid-connected and standalone operations, and seamless transition between these modes were observed.

Example 5

Figure 13:
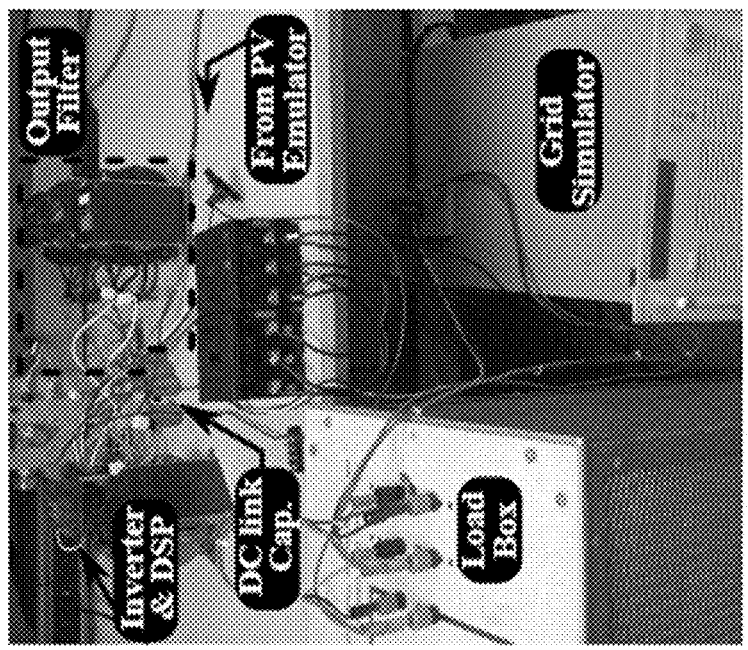
FIG. 13 is a photograph of an experimental set up.

An inventive embodiment of the proposed controller was experimentally validated using a test the grid that was emulated with a Chroma three-phase ac source with a 60V L-N voltage. A buck converter was implanted as the stage I converter, which connected a Chroma PV simulator to the inverter's dc link capacitor. Controllers for both stage I and the proposed eVSM were implemented on a float point Texas Instrument TMS320F28335 DSP. A dc link center voltage was designed to be at 250V, and the rest of the system parameters are as presented in TABLE I. A view of the experimental set up is shown in FIG. 13.

Figure 12A:
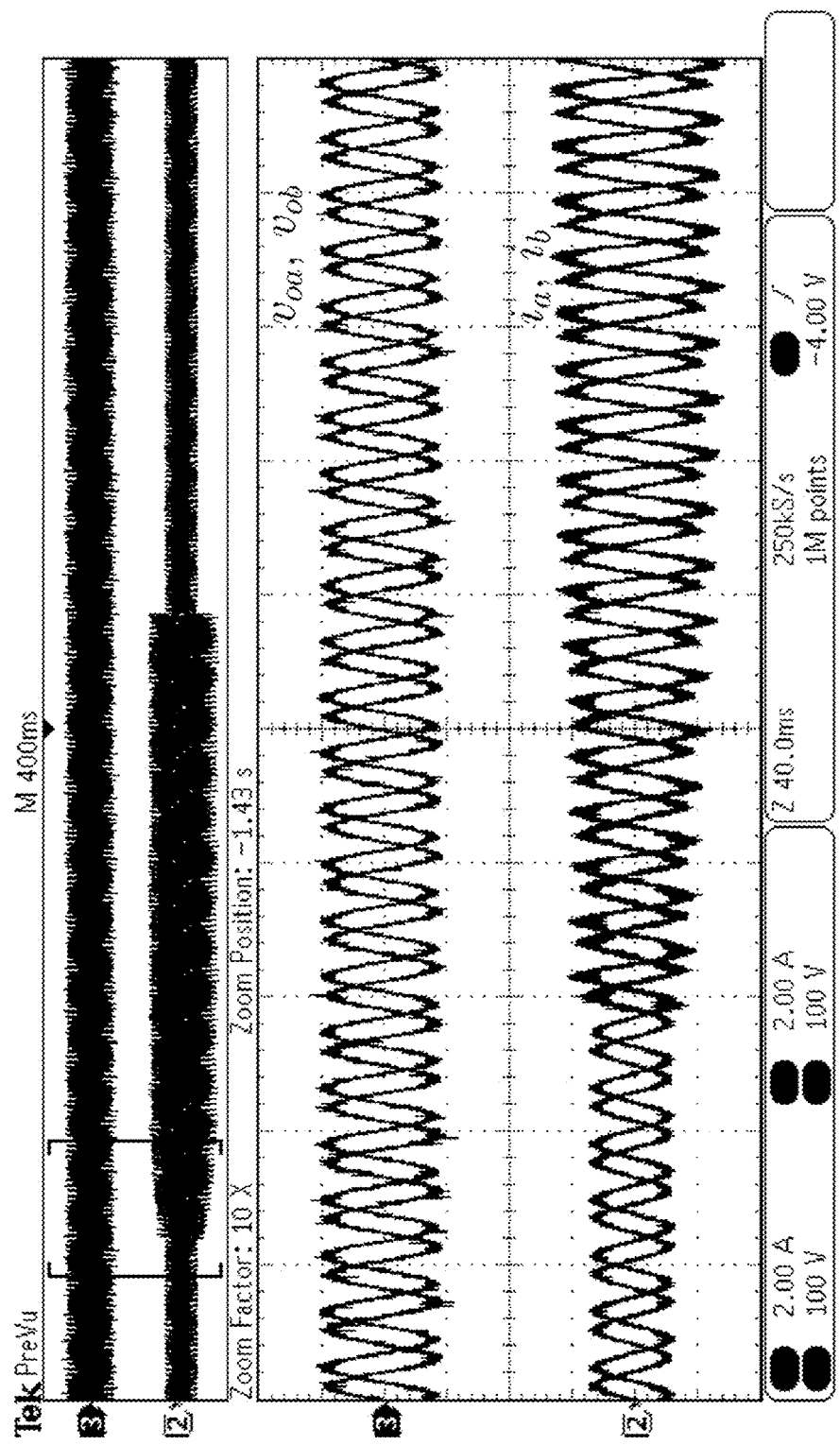
FIGS. 12A and 12B illustrate the results of the performance of an embodiment the proposed controller during SA, GC, and transition between these two modes of operation.
Figure 12B:
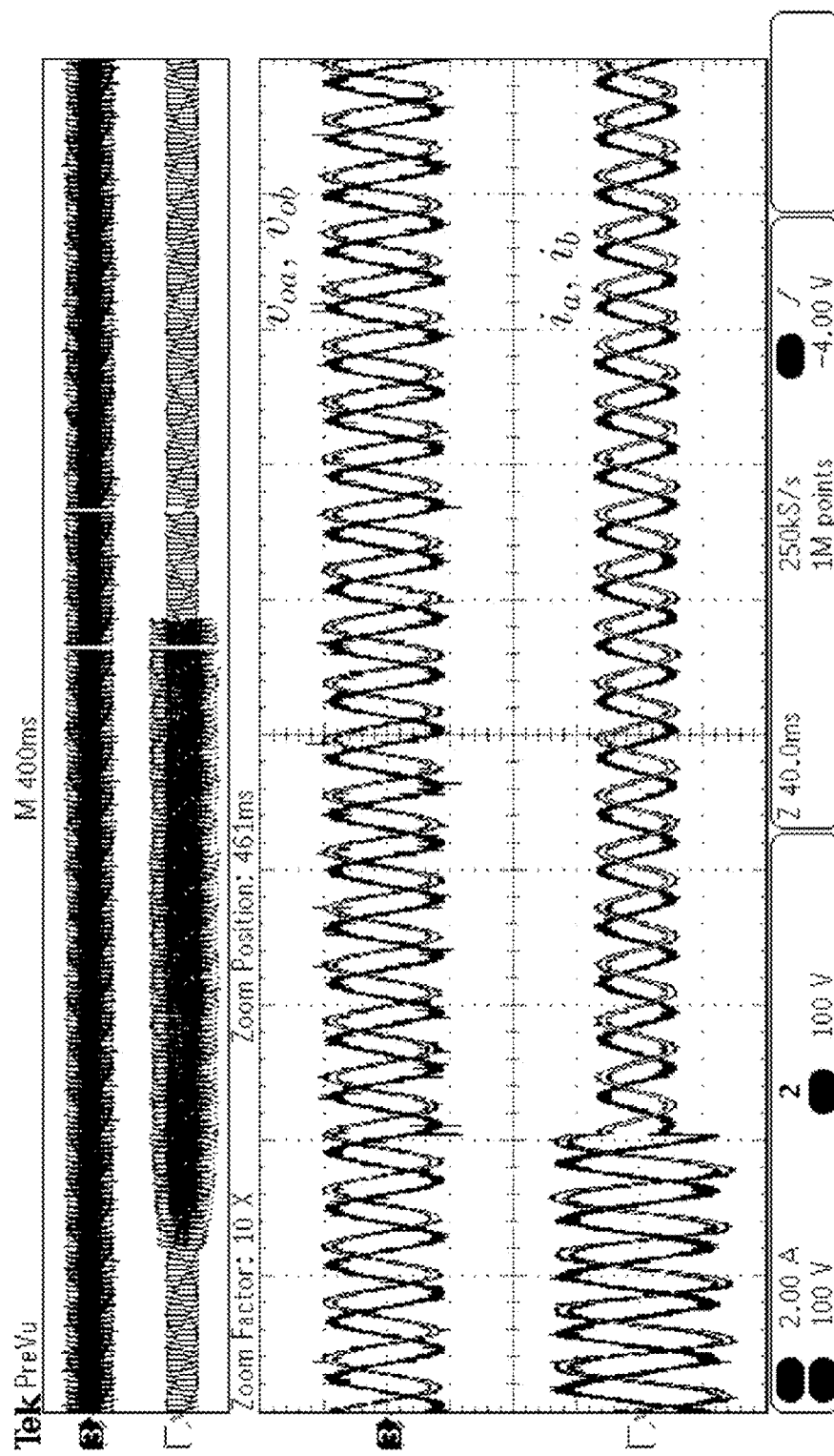

FIGS. 12A and 12B illustrate the results of the performance of the proposed controller during SA, GC, and transition between these two modes of operation. Channels Ch.1 and Ch.2 are inverter currents $i_a$ and $i_b$ (2 A/div), Ch.3 and Ch.4 are inverter phase voltages $v_{oa}$ and $v_{ob}$ (100V/div). In FIG. 12A, the inverter is initially supplying local loads in the SA mode, and then the inverter is connected to the grid (GC mode) to inject power from the PV source to the grid and finally in FIG. 12B the inverter is disconnected from the grid (GC mode) and goes back to the SA mode. FIGS. 12A and 12B both show the stable operation of the inventive inverter during both SA and GC and also the smooth transition of the inverter from SA to GC and vice versa, respectively.

Figure 14:
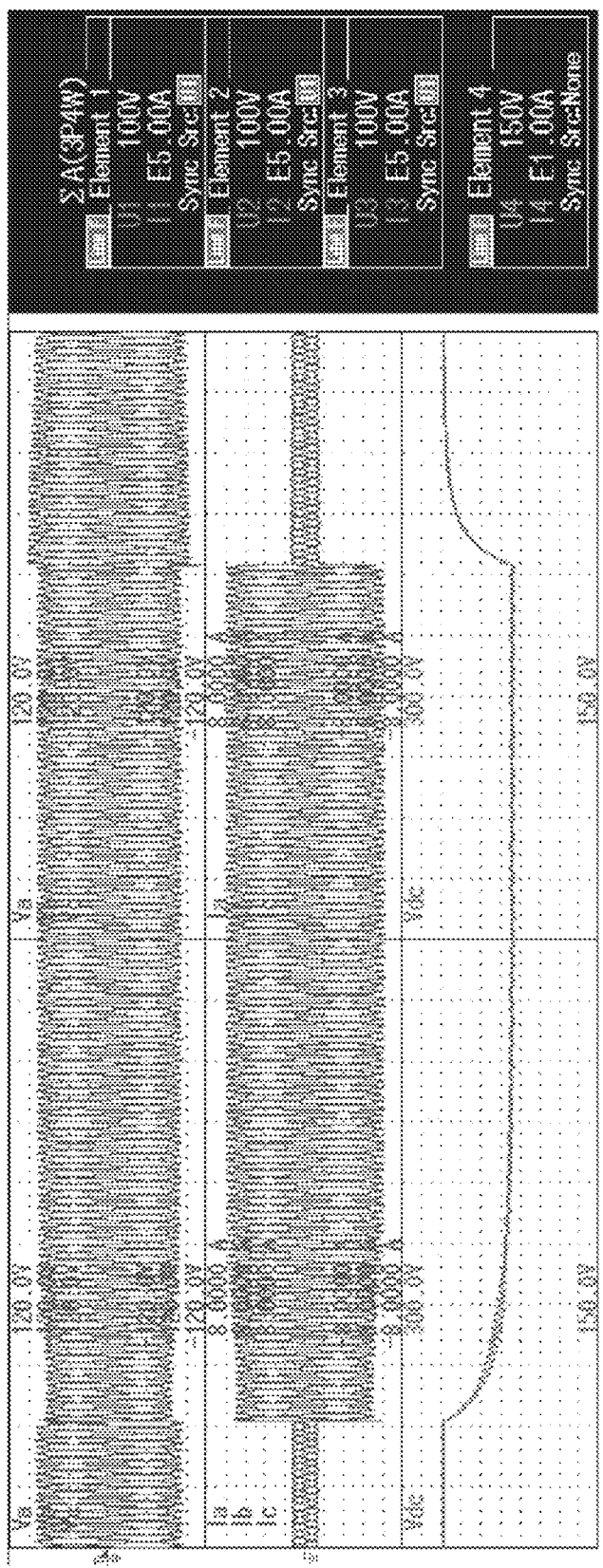
FIG. 14 illustrates the results showing the standalone load change, with the top line showing inverter LN voltages, the middle line showing inverter currents, and the bottom line showing Vdc (50 ms/div), and where the left side of the graph shows the load increased from 150 W to 500 W and the right side of the graph shows the load decreased.

Load jump scenarios are presented in FIG. 14, where the load in SA mode jumps from 150 W to 500 W and vice versa. The dc link voltage variations in response to the frequency variations are also shown in FIG. 14.

Figure 15A:
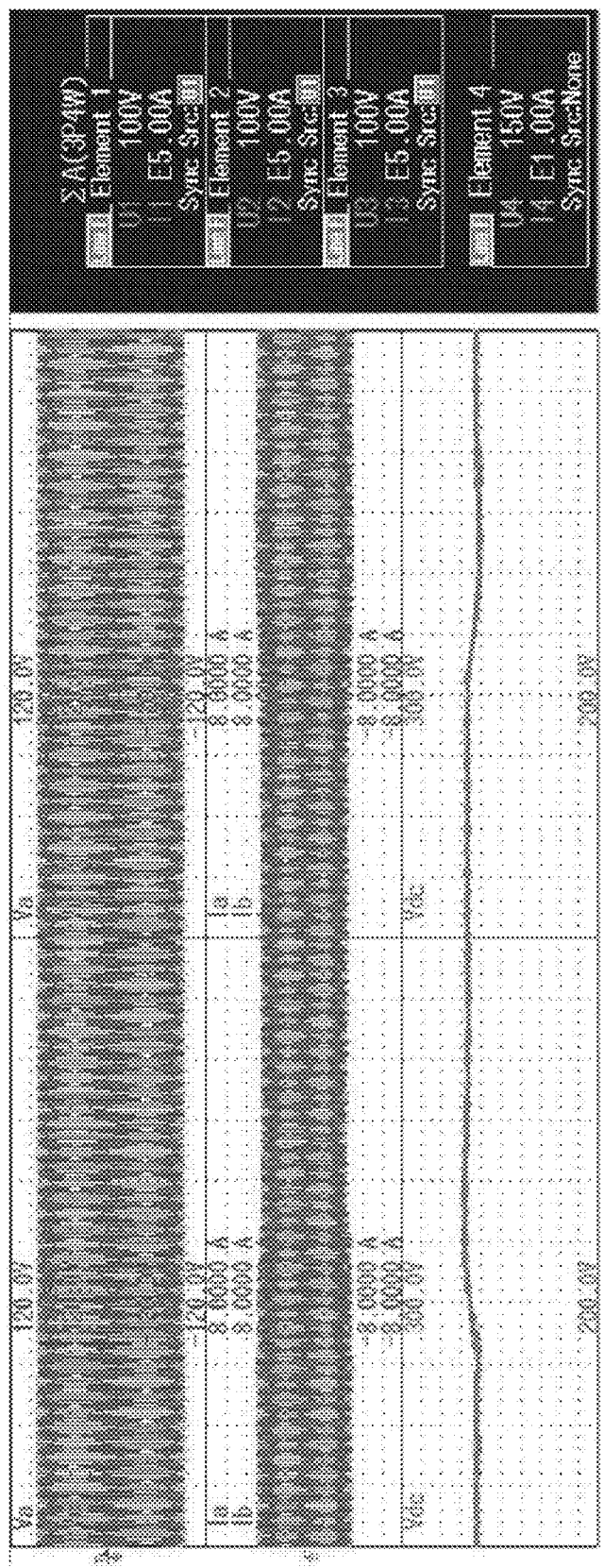
FIGS. 15A-15C illustrate the results of the grid frequency jump, with the top of 15A and 15B showing inverter LN voltages, the middle of 15A and 15B showing inverter currents, and the bottom of 15A and 15B showing Vdc (100 ms/div). Pmpp=450 W and f jumps (15A) left: 60 Hz to 60.1 Hz, right: 60.1 Hz to 60 Hz, (15B) left: 60 Hz to 59.9 Hz, right: 59.9 Hz to 60 Hz, and 15C showing pout during these jumps.
Figure 15B:
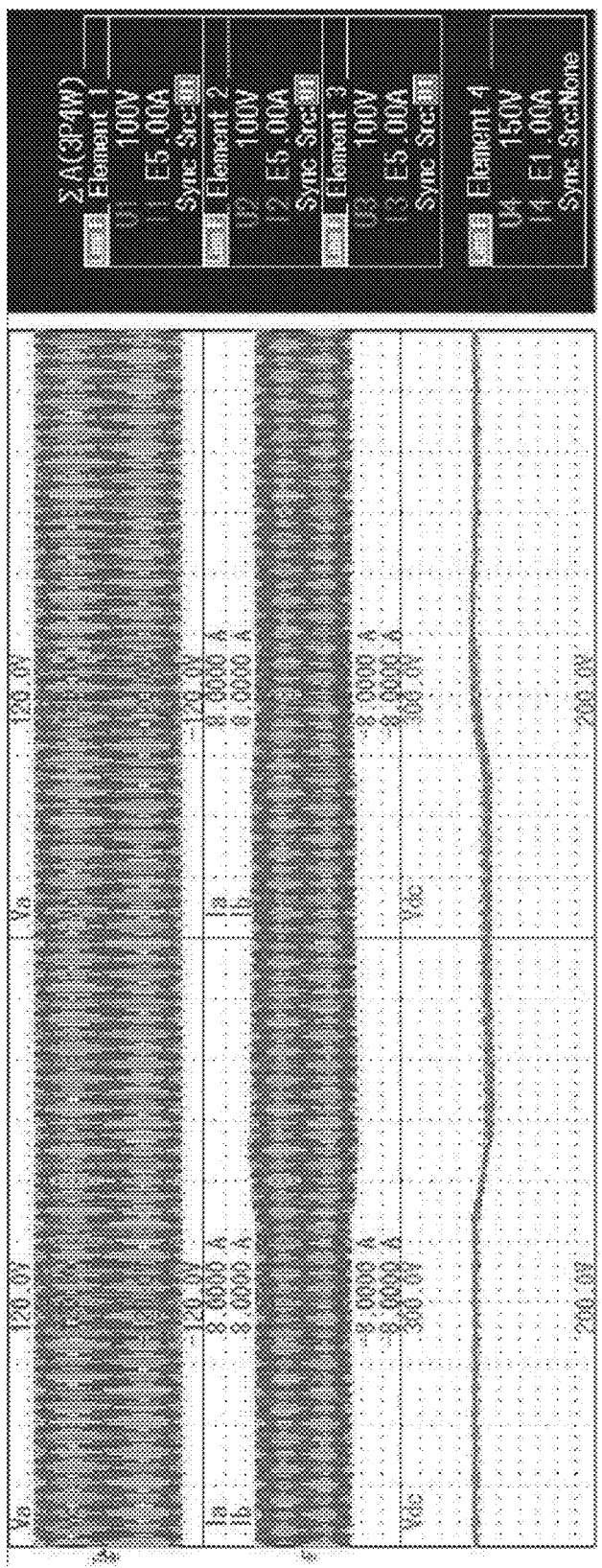
Figure 15C:
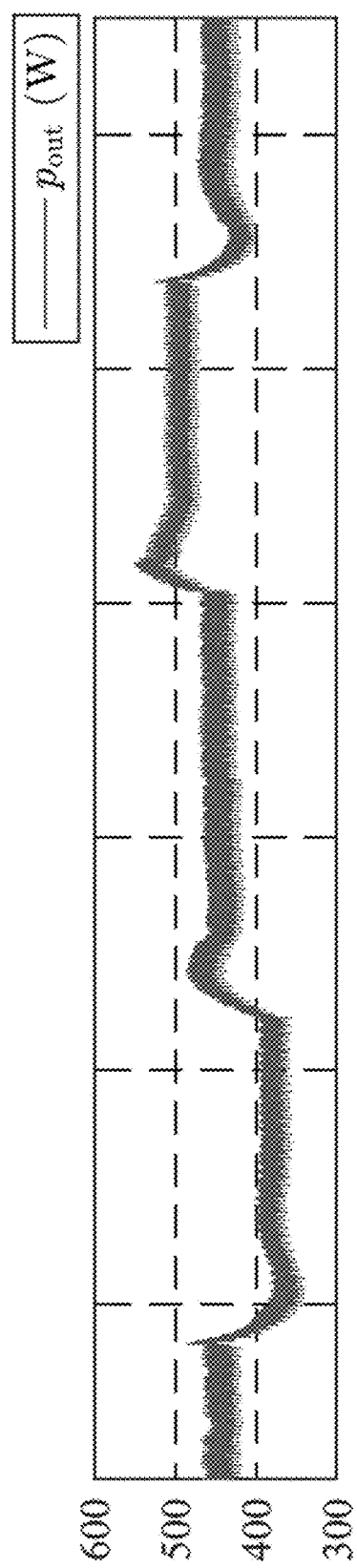

The results shown in FIGS. 15a-c show the invertor working in GC mode, where the grid frequency jumps in the following sequence: from 60 Hz to 60.1 Hz to 59.9 Hz and back to 60 Hz. It can be observed that the controller reacts to frequency jumps and the active power as well as the dc link voltage change accordingly.

Figure 16A:
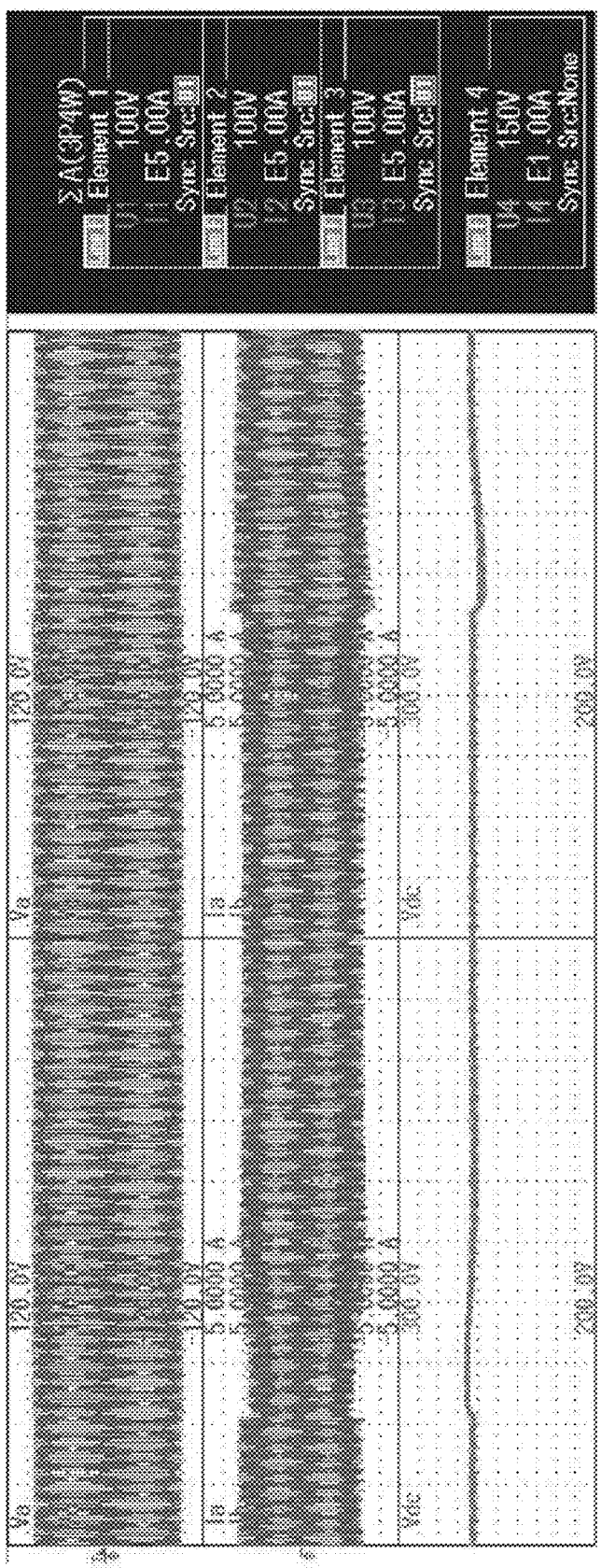
FIGS. 16A-16C illustrate experimental results for the grid amplitude jump, with the top of 16A and 16B showing inverter LN voltages, the middle of 16A and 16B showing inverter currents, and the bottom of 16A and 16B showing Vdc (100 ms/div), (16A) nominal grid 2.5% increase and back to nominal grid (16B) nominal grid 2.5% decrease and back to nominal grid right, and 16C showing output active and reactive power.
Figure 16B:
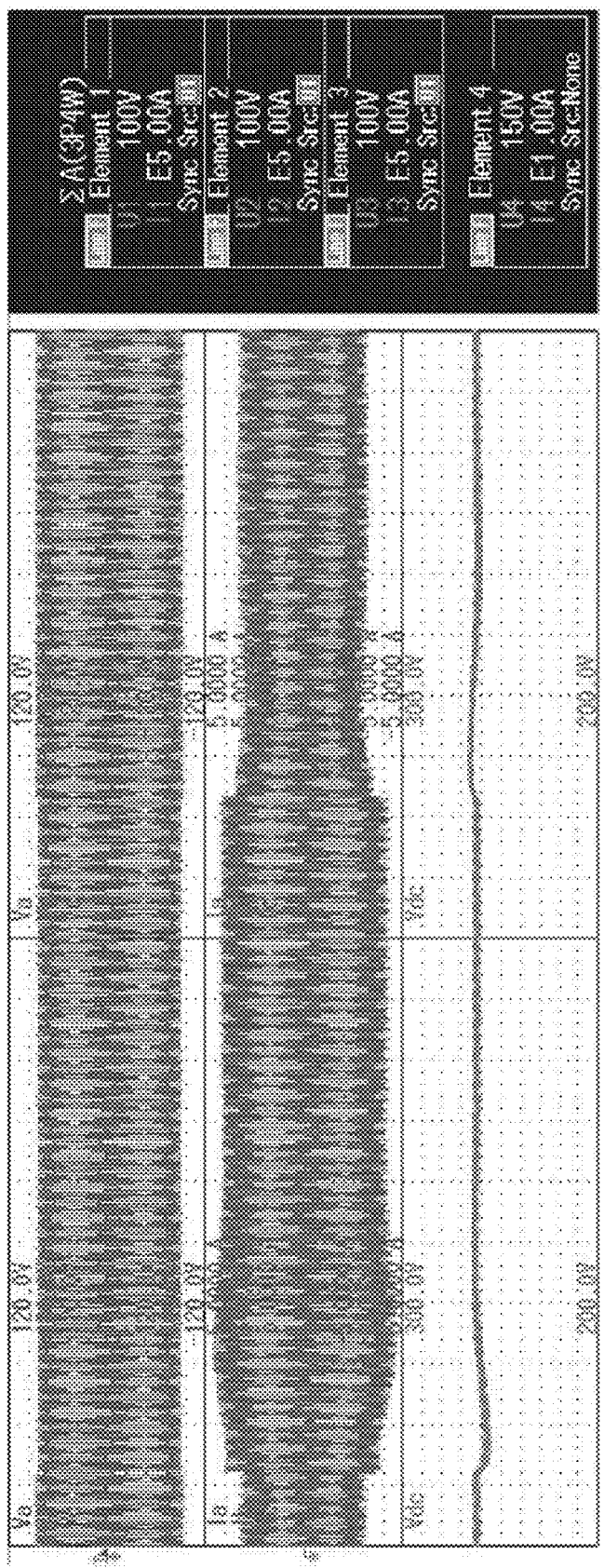
Figure 16C:
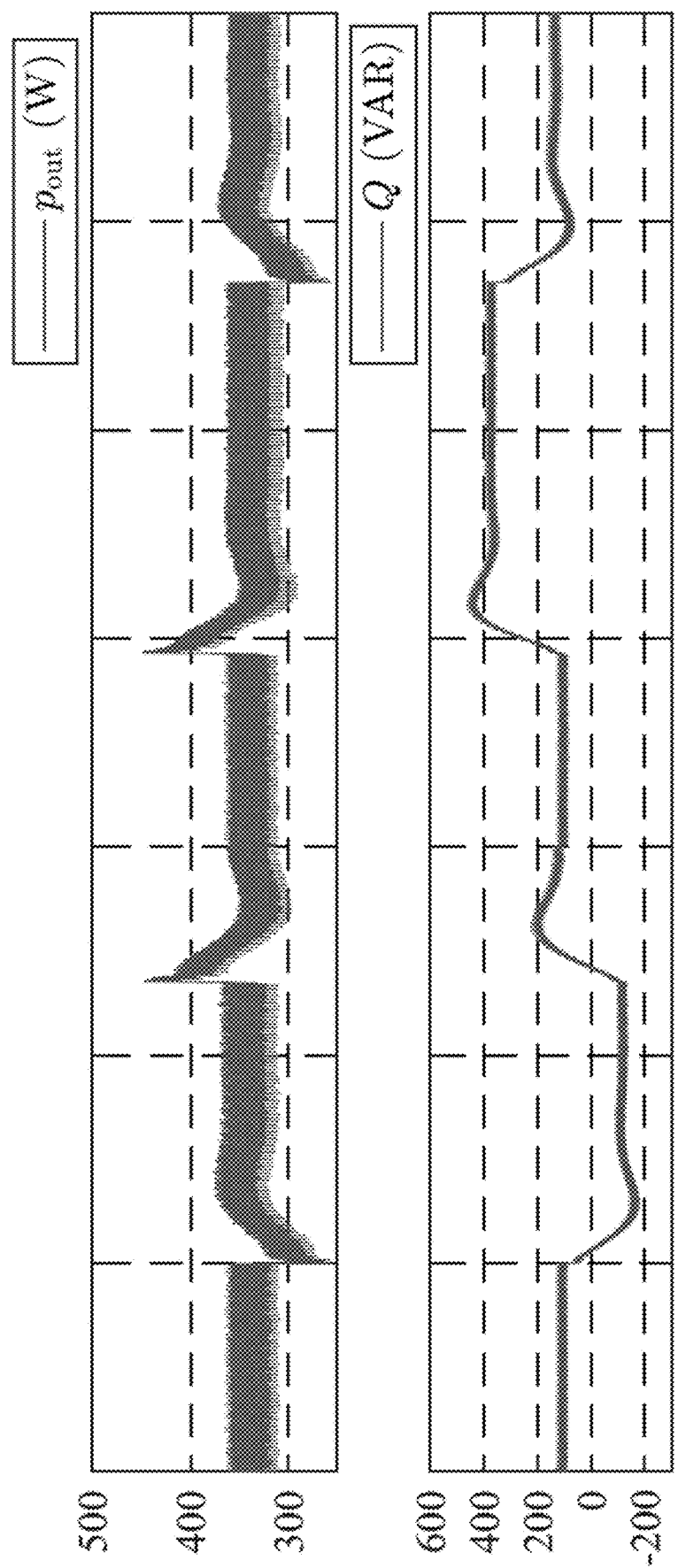

Grid voltage amplitude is also changed by +/−2.5% and results are presented in FIGS. 16a-c. Change in the output reactive power can be observed in these results.

Figure 17:
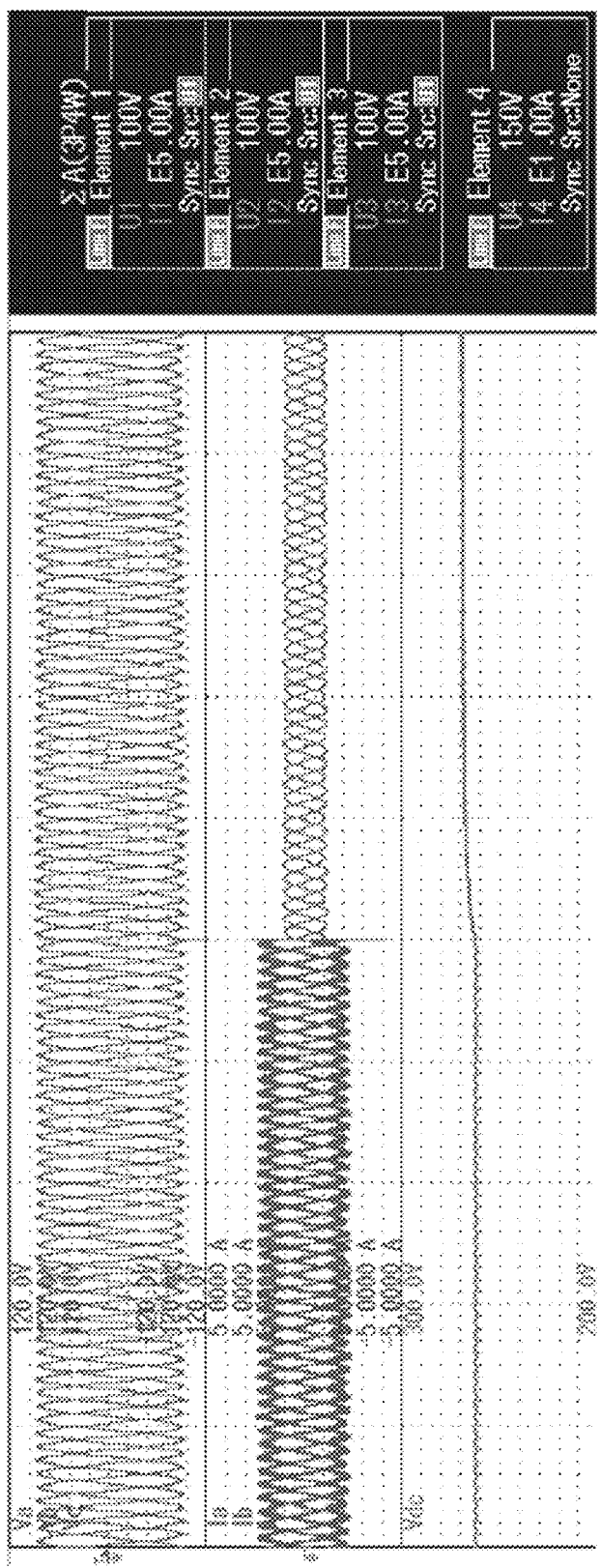
FIG. 17 illustrates experimental results for GC to SA, with the top line showing inverter LN voltages, the middle line showing inverter currents, and the bottom line showing Vdc (50 ms/div).

The controller also provides a seamless transient between SA and GC modes of operation. Results in FIG. 17 show the inverter voltage and current during transition from GC to SA mode, where the voltage remains stable and the inverter continues supplying local loads.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

REFERENCES

The references listed below and all references cited herein are hereby incorporated by reference in their entireties.
(1) C. K. Sao and P. W. Lehn, "Control and power management of converter fed microgrids," *IEEE Transactions on Power Systems*, vol. 23, no. 3, pp. 1088-1098, 2008.

(2) J. M. Guerrero, P. C. Loh, M. Chandorkar, and T.-L. Lee, "Advanced control architectures for intelligent microgrids, part I: Decentralized and hierarchical control," *IEEE Transactions on Industrial Electronics*, vol. 60, no. 4, pp. 1254-1262, 2013.

(3) J. C. Vá squez Quintero, J. M. Guerrero Zapata, M. Savaghevi, R. Teodorescu et al., "Modeling, analysis, and design of stationary reference frame droop controlled parallel three-phase voltage source inverters," *IEEE Trans. Ind. Elect.*, vol. 60, no. 4, pp. 1271-1280, 2013.

(4) H.-P. Beck and R. Hesse, "Virtual synchronous machine," in *Electrical Power Quality and Utilisation, 2007. EPQU 2007. 9th International Conference on.* IEEE, 2007, pp. 1-6.

(5) Q.-C. Zhong and G. Weiss, "Synchronverters: Inverters that mimic synchronous generators," *Industrial Electronics, IEEE Transactions on*, vol. 58, no. 4, pp. 1259-1267, 2011.

(6) Q.-C. Zhong, P.-L. Nguyen, Z. Ma, and W. Sheng, "Self-synchronized synchronverters: Inverters without a dedicated synchronization unit," *Power Electronics, IEEE Trans on*, vol. 29, no. 2, pp. 617-630, 2014.

(7) M. Ashabani and Y. Abdel-Rady Mohamed, "New family of microgrid control and management strategies in smart distribution grids analysis, comparison and testing," *Power Systems, IEEE Transactions on*, vol. Digital Object Identifier 10.1109/TPWRS.201.4.2306016.

(8) F. Gao and M. R. Iravani, "A control strategy for a distributed generation unit in grid-connected and autonomous modes of operation," *IEEE Transactions on power delivery*, vol. 23, no. 2, pp. 850-859, 2008.

(9) M. Karimi-Ghartemani, "Universal integrated synchronization and control for single-phase DC/AC converters," *IEEE Transactions on Power Electronics*, vol. 30, no. 3, pp. 1544-1.557, 2015.

(10) M. Karimi-Ghartemani, S. A. Khajehoddin, P. Piya, and M. Ebrahimi, "Universal controller for three-phase inverters in a microgrid," *IEEE Journal of Emerging and Selected Topics in Power Electronics*, vol. 4, no. 4, pp. 1342-1353, 2016.

(11) M. Ashabani and Y. Abdel-Rady I. Mohamed, "Novel comprehensive control framework for incorporating vscs to smart power grids using bidirectional synchronous-vsc," *Power Systems, IEEE Transactions on*, vol. 29, no. 2, pp. 943-957, 2014.

(12) S. B. Kjaer, J. K. Pedersen, and F. 131.aabjerg, "A review of single-phase grid-connected inverters for photovoltaic modules," *Industry Applications, IEEE Transactions on*, vol. 41, no. 5, pp. 1292-1306, 2005.

(13) F. Blaabjerg, R. Teodorescu, M. Liserre, and A. Timbus, "Overview of control and grid synchronization for distributed power generation systems," *Industrial Electronics, IEEE Transactions on*, vol. 53, no. 5, pp. 1398-1409, October 2006.

(14) M. Ebrahimi, S. A. Khajehoddin, and M. Karimi-Ghartemani, "Fast and robust single-phase dq current controller for smart inverter applications," *IEEE Transactions on Power Electronics*, vol. 31, no. 5, pp. 3968-3976, 2016.

(15) S. Khajehoddin, M. Karimi-Ciharteman, A. Bakhshai, and P. Jain, "High quality output current control for single phase grid-connected inverters," in *Applied Power Electronics Conference and Exposition (APEC), 2014 Twenty-Ninth Annual IEEE*. IEEE, 2014, pp. 1807-1814.

(16) S. D'Arco and J. A. Suul, "Equivalence of virtual synchronous machines and frequency-droops for converter-based microgrids," *IEEE Transactions on Smart Grid*, vol 5, no. 1, pp. 394-395, 2014.

(17) S. D'Arco and J.A. Suul, "Virtual synchronous machines classification of implementations and analysis of equivalence to droop controllers for microgrids," in *PowerTech (POWERTECH), 2013 IEEE Grenoble*. IEEE, 2013, pp. 1-7.

(18) H. Alatrash, A. Mensah, E. Mark, G. Haddad, and J. Enslin, "Generator emulation controls for photovoltaic inverters," *IEEE Transactions on Smart Grid*, vol. 3, no. 2, pp. 996-1011, 2012.

(19) Y. Chen, R. Hesse, D. Turschner, and H.-P. Beck, "Comparison of methods for implementing virtual synchronous machine on inverters," in *International Conference on Renewable Energies and Power Quality-ICREPQ. 12*, 2012.

(20) J. A. Suul, S. D'Arco, and G. Guidi, "Virtual synchronous machine-based control of a single-phase bi-directional battery charger for providing vehicle-to-grid services," *IEEE Transactions on Industry Applications*, vol. 52, no. 4, pp. 3234-3244, 2016.

(21) S. Dong and Y. C. Chen, "Adjusting synchronverter dynamic response speed via damping correction loop," *IEEE Transactions on Energy Conversion*, 2016.

(22) D. Chen, Y. Xu, and A. Q. Huang, "Integration of de microgrids as virtual synchronous machines into the ac grid," *IEEE Transactions on Industrial Electronics*, vol. PP, no. 99, pp 1-1, 2017.

(23) S. A. Khajehoddin, M. Karimi-Ghartemani, P. K. Jain, and A. Bakhshai, "Dc-bus design and control for a single-phase grid-connected renewable converter with a small energy storage component," *IEEE Transactions on Power Electronics*, vol. 28, no. 7, pp. 3245-3254, 2013.

The invention claimed is:

1. A method for implementing a controller for control of an inverter for implementation of a model of a synchronous generator with a virtual rotor with a rotor speed represented by an internal frequency ($\omega_m$) to convert a dc input to an ac output, said method comprising:

implementing the virtual rotor to emulate an inertia (J) of an actual rotor using an intermediate dc-link capacitor ($C_{dc}$) of the inverter, the implementing comprising:

controlling a voltage of the intermediate dc-link capacitor ($C_{dc}$);

simulating a rotor speed of the virtual rotor based on the voltage of the intermediate dc-link capacitor ($C_{dc}$), while allowing the voltage applied to change in a defined range; and mapping a changing voltage of the intermediate dc-link capacitor ($C_{dc}$) into the inverter as the internal frequency ($\omega_m$), where the controller for the inverter does not duplicate the emulated inertia (J).

2. The method of claim 1 further comprising providing self-synchronization prior to connecting the inverter to a grid.

3. The method of claim 1 further comprising providing a virtual impedance at an output of the inverter as a gain value that represents a virtual resistance that enables achieving a stability margin.

4. The method of claim 1 further comprising applying a power dampening term $P_{dmp}$ as a voltage amplitude $V_{dmp}$ of a grid voltage $v_g$, where $$V_{dmp} =$$
$$-\frac{2}{3}D\frac{d}{dt}(\tilde{\cos}\theta \cdot v_g) = -DV_g\frac{d}{dt}[\sin(\theta - \theta_g)] \approx DV_g(\omega_g - \omega_m)\cos(\theta - \theta_g)$$

that introduces a damping effect into an internal voltage magnitude E which in turn translates into $P_{dmp}$.

5. The method of claim 4 wherein a calculated reference Q* is used to derive the internal voltage amplitude E given by $$Q^* = Q_n - k_v(V_g - V_n), \dot{E} = k_q(Q^* - Q)$$

where the reactive power Q is given by $$Q = -E\tilde{\cos}\theta \cdot i = -E\cos\theta i_a - E\cos\left(\theta - \frac{2\pi}{3}\right)i_b - E\cos\left(\theta + \frac{2\pi}{3}\right)i_c.$$

6. The method of claim 1 wherein the method of self-synchronization comprises:
calculating a cross product of a grid voltage $v_g$ and an inverter voltage $v_o$ as a signal sync $$\text{Sync} = \left(\mu_1 + \frac{\mu_2}{s}\right)(v_{o\alpha}v_{g\beta} - v_{o\beta}v_{g\alpha}) = \left(\mu_1 + \frac{\mu_2}{s}\right)V_oV_g\sin(\phi_g - \phi_o)$$

where α and β indices denote variables transformed to aft domain by a Clarke transformation and Vo is an output voltage amplitude and $\phi_g$ and $\phi_o$ are grid and output voltage phase angles.

7. The method of claim 6 further comprising adjusting the signal Sync to make $\phi_g$ and $\phi_o$ to be equal prior to closing a grid connection switch.

8. A system for connecting a power generation unit to a power grid comprising:
a control device for an inverter, the control device implementing a model of a synchronous generator, the control device comprising:
a computer processor in electrical communication with a storage device with instructions stored thereon, that when executed on the computer processor, perform a method for implementing a controller for control of an inverter for implementation of a model of a synchronous generator with a virtual rotor with a rotor speed represented by an internal frequency ($\omega_m$) to convert a dc input to an ac output, said method comprising:
implementing a virtual rotor to emulate an inertia (J) of an actual rotor using an intermediate dc-link capacitor ($C_{dc}$) of the inverter, the implementing comprising:
controlling a voltage of the intermediate dc-link capacitor ($C_{dc}$);
simulating the rotor speed of the virtual rotor based on the measured voltage of the intermediate dc-link capacitor ($C_{dc}$), while allowing the voltage applied to change in a defined range; and
mapping the changing capacitor voltage of the intermediate dc-link capacitor ($C_{dc}$) into the inverter as the internal frequency ($\omega_m$), where the controller for the inverter does not duplicate the emulated inertia (J).

9. The system of claim 8 further comprising providing a virtual impedance at an output of the inverter as a gain value that represents a virtual resistance that enables achieving a stability margin.

10. The system of claim 8 further comprising applying a power dampening term $P_{dmp}$ as a voltage amplitude $V_{dmp}$ of a grid voltage $v_g$, where $$V_{dmp} =$$
$$-\frac{2}{3}D\frac{d}{dt}(\tilde{\cos}\theta \cdot v_g) = -DV_g\frac{d}{dt}[\sin(\theta - \theta_g)] \approx DV_g(\omega_g - \omega_m)\cos(\theta - \theta_g)$$

that introduces a damping effect in to an internal voltage magnitude E which in turn translates into $P_{dmp}$.

11. The system of claim 10 further comprising a calculated reference Q* that is used to derive the internal voltage amplitude E given by $$Q^* = Q_n - k_v(V_g - V_n), \dot{E} = k_q(Q^* - Q)$$

where the reactive power Q is given by $$Q = -E\tilde{\cos}\theta \cdot i = -E\cos\theta i_a - E\cos\left(\theta - \frac{2\pi}{3}\right)i_b - E\cos\left(\theta + \frac{2\pi}{3}\right)i_c.$$

12. The system of claim 8 further comprising providing self-synchronization prior to connecting the inverter to a grid.

13. The system of claim 12 wherein the self-synchronization further comprises:
calculating a cross product of a grid voltage v and an inverter voltage $v_o$ as a sync signal $$\text{Sync} = \left(\mu_1 + \frac{\mu_2}{s}\right)(v_{o\alpha}v_{g\beta} - v_{o\beta}v_{g\alpha}) = \left(\mu_1 + \frac{\mu_2}{s}\right)V_oV_g\sin(\phi_g - \phi_o)$$

where α and β indices denote variables transformed to aft domain by a Clarke transformation and Vo is an output voltage amplitude and $\phi_g$ and $\phi_o$ are grid and output voltage phase angles.

14. The system of claim 13 wherein the self-synchronization further comprises adjusting the signal Sync to make $\phi_g$ and $\phi_o$ to be equal prior to closing a grid connection switch between an output of a power generation unit and a power grid.

15. The system of claim 14 wherein the power generation unit is a distributed and renewable energy source.

16. The system of claim 15 wherein the power generation distributed and renewable energy source further comprises photovoltaic (PV) or wind systems.

* * * * *